(12) United States Patent
Nakagawa

(10) Patent No.: US 8,990,808 B2
(45) Date of Patent: Mar. 24, 2015

(54) DATA RELAY DEVICE, COMPUTER-READABLE RECORDING MEDIUM, AND DATA RELAY METHOD

(75) Inventor: Yukihiro Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 13/592,421

(22) Filed: Aug. 23, 2012

(65) Prior Publication Data

US 2013/0061225 A1    Mar. 7, 2013

(30) Foreign Application Priority Data

Sep. 5, 2011  (JP) ................................ 2011-193358
Mar. 26, 2012  (JP) ................................ 2012-070386

(51) Int. Cl.
*G06F 9/455*     (2006.01)
*G06F 15/16*    (2006.01)
*H04L 29/06*    (2006.01)

(52) U.S. Cl.
CPC ............. *G06F 9/45558* (2013.01); *H04L 63/10* (2013.01); *G06F 9/45533* (2013.01); *G06F 2009/4557* (2013.01)
USPC .............................................. 718/1; 709/229

(58) Field of Classification Search
CPC .................................................. G06F 9/45533
See application file for complete search history.

(56) References Cited

U.S. PATENT DOCUMENTS

2010/0082951 A1* 4/2010 Bates et al. ................... 712/228

FOREIGN PATENT DOCUMENTS

JP          2011-070549 A      4/2011

* cited by examiner

*Primary Examiner* — Camquy Truong
(74) *Attorney, Agent, or Firm* — Fujitsu Patent Center

(57) ABSTRACT

A data relay device includes a memory and a processor. The processor executes a data relay process includes determining that determining whether or not a storage device, which stores a virtual machine identifier of a virtual machine operated by the server connected with the computer and a port, stores the received virtual machine identifier in association with another port. The data relay process includes transferring that transfers the setting request of the port profile to a data relay device of an upper level higher than the data relay device in a communication path through which the virtual machine represented by the virtual machine identifier performs communication when it is determined that the received virtual machine identifier is not stored in association with the other port.

21 Claims, 30 Drawing Sheets

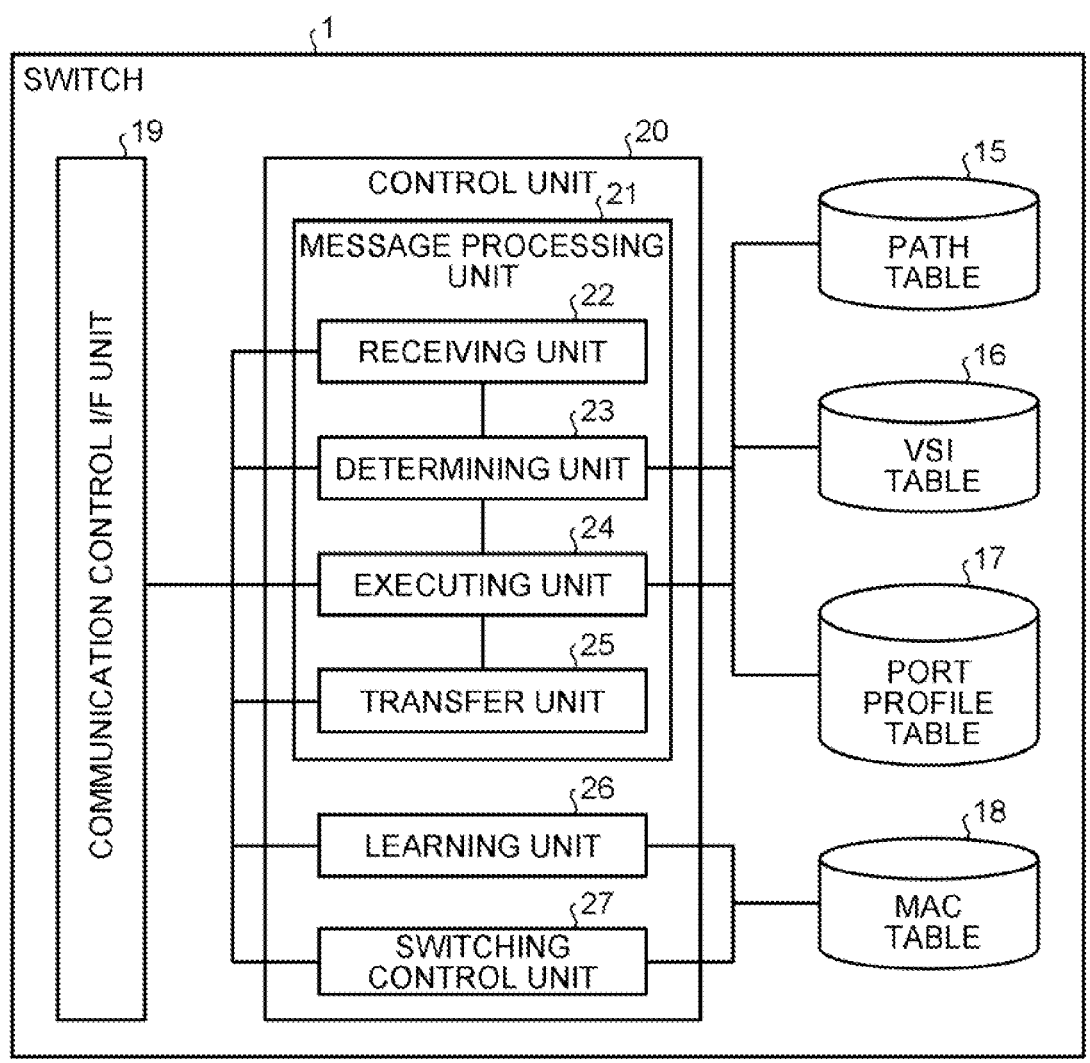

FIG.7

| VSI ID | PORT PROFILE ID | VSI STATE | PORT NO. |
|---|---|---|---|
| VM #1 | 1 | FETCHED | P1 |
| VM #3 | 2 | ACTIVE | P2 |
| ... | ... | ... | ... |

FIG.8

| PORT PROFILE ID | VLAN | BAND INFORMATION |
|---|---|---|
| 1 | VLAN100 | 50MB |
| 2 | VLAN200 | 100MB |
| ... | ... | ... |

FIG.9A

| MAC ADDRESS | RELAY DESTINATION |
|---|---|
| MAC1 | SERVER 11 |
| MAC2 | SWITCH 4 |
| MAC3 | SERVER 12 |
| MAC4 | SWITCH 5 |

FIG.9B

| MAC ADDRESS | RELAY DESTINATION |
|---|---|
| MAC1 | SWITCH 4 |
| MAC2 | SERVER 13 |
| MAC3 | – |
| MAC4 | – |

FIG.9C

| MAC ADDRESS | RELAY DESTINATION |
|---|---|
| MAC1 | – |
| MAC2 | – |
| MAC3 | SWITCH 5 |
| MAC4 | SERVER 14 |

FIG.9D

| MAC ADDRESS | RELAY DESTINATION |
|---|---|
| MAC1 | SWITCH 1 |
| MAC2 | SWITCH 2 |
| MAC3 | – |
| MAC4 | – |

FIG.9E

| MAC ADDRESS | RELAY DESTINATION |
|---|---|
| MAC1 | – |
| MAC2 | – |
| MAC3 | SWITCH 1 |
| MAC4 | SWITCH 3 |

FIG.11A

| MAC ADDRESS | RELAY DESTINATION |
|---|---|
| MAC1 | SERVER 11 |
| MAC2 | SWITCH 4 |
| MAC3 | SERVER 12 |
| MAC4 | SWITCH 4 | ~ (E)

FIG.11B

| MAC ADDRESS | RELAY DESTINATION |
|---|---|
| MAC1 | SWITCH 4 |
| MAC2 | SERVER 13 |
| MAC3 | SWITCH 4 |
| MAC4 | SERVER 13 | ~ (F)

FIG.11C

| MAC ADDRESS | RELAY DESTINATION |
|---|---|
| MAC1 | – |
| MAC2 | – |
| MAC3 | – |
| MAC4 | – | ~ (G)

FIG.11D

| MAC ADDRESS | RELAY DESTINATION |
|---|---|
| MAC1 | SWITCH 1 |
| MAC2 | SWITCH 2 |
| MAC3 | SWITCH 1 |
| MAC4 | SWITCH 2 | ～(H)

FIG.11E

| MAC ADDRESS | RELAY DESTINATION |
|---|---|
| MAC1 | – |
| MAC2 | – |
| MAC3 | SWITCH 1 |
| MAC4 | SWITCH 3 |

FIG.19

| PIN GROUP | UPLINK BEFORE CHANGE | UPLINK AFTER CHANGE | VM | REMARKS |
|---|---|---|---|---|
| A | SWITCH 44 | – | VM #1, VM #2 | |
| B | SWITCH 45 | SWITCH 44 | VM #3, VM #4 | |
| ⋮ | ⋮ | ⋮ | ⋮ | |

DATA RELAY DEVICE, COMPUTER-READABLE RECORDING MEDIUM, AND DATA RELAY METHOD

CROSS-REFERENCE TO RELATED APPLICATIONS

This application is based upon and claims the benefit of priority of the prior Japanese Patent Application No. 2011-193358, filed on Sep. 5, 2011, and the Japanese Patent Application No. 2012-070386, filed on Mar. 26, 2012, the entire contents of which are incorporated herein by reference.

FIELD

The embodiments discussed herein are related to a data relay device, a data relay program, and a data relay method.

BACKGROUND

Conventionally, a server virtualization technique has been known that operates a virtual information processing apparatus such as a virtual machine (VM) on a server functioning as an information processing apparatus. A live migration technique that moves a VM being operated in a certain server to another server without stopping a task has been known as one of functions related to the virtualization technique.

The live migration technique is used in a cloud data center environment in which a VM is able to move freely. For example, the cloud data center includes a plurality of servers that operate VMs and one or more switch that relays communication with a VM executed by each server. Each switch relays communication with VMs according to a port profile representing, for example, a quality of service (QoS) or a virtual local area network (VLAN) of a VM operated by each server.

A virtual station interface (VSI) discovery protocol which is discussed in the Institute of Electrical and Electronics Engineers, Inc (IEEE) 802.1Qbg has been known as an example of a technique of automating setting of the port profile. An example of automatic setting of a port profile (automated migration of port profile (AMPP))) using the VSI discovery protocol will be described below.

FIG. 30 is a sequence diagram illustrating an example of an automated process of a port profile according to a related art. In an example illustrated in FIG. 30, a description will be made in connection with an example of a process which is executed by a source server which is a source of a VM of a migration target, a destination server which is a destination of the VM, and a switch that relays communication between the source server and the destination server. In the following description, a port of a switch connected with a destination server is referred to as a destination port, and a port of a switch connected with a source server is referred to as a source port.

In the example illustrated in FIG. 30, the destination server receives an instruction operation from an administrator or the like and automatically generates a new VM on the local server (S1). Subsequently, when the source server receives a live migration instruction (S2), the source server and the destination server perform a pre-copy process of copying data of the VM from the source server to the destination server in a stepwise manner while operating the VM (S3 and S4).

When the pre-copy process starts, the destination server transmits a PRE-ASSOC message of the VSI discovery protocol to the destination port of the switch (S5). The switch that has received the message acquires a port profile corresponding to a VM which is a migration target, and performs preparation for setting the acquired port profile to its destination port (S6). Then, the switch transmits a PRE-ASSOC-CONF message to the destination server in response to the PRE-ASSOC message (S7).

Next, the source server and the destination server execute a stop and copy process of temporarily stopping a task of the migration target VM and then transferring memory content being used by itself from the source server to the destination server (S8 and S9). When the stop and copy process starts, the destination server transmits an ASSOC message of the VSI discovery protocol to the destination port of the switch (S10).

In this case, the switch sets the port profile acquired when the PRE-ASSOC message is received to the destination port (S11). Then, the switch transmits an ASSOC-CONF message to the destination server in response to the ASSOC message (S12). After step S12, the migration target VM operates on the destination server.

Meanwhile, the source server transmits a DE-ASSOC message of the VSI discovery protocol to the source port of the switch (S13). Upon receiving the DE-ASSOC message, the switch deletes setting of the port profile set to the source port, that is, setting of the port profile corresponding to the VM which is the migration target (S14). Then, the switch transmits a DE-ASSOC-CONF message to the source server in response to the DE-ASSOC message (S15). In the above-described way, migration of a VM and automatic setting of a port profile are executed.

Meanwhile, a multipath technique has been known that increases a communication band between servers by connecting a plurality of paths between servers. Next, an example of a system of a cloud data center to which a multipath technique is applied will be described with reference to FIG. 31. FIG. 31 is a diagram for describing an example of a system to which a multipath technique is applied. In an example illustrated in FIG. 31, a system 30 includes a plurality of servers 36 to 39 which operate VMs #1 to #4, respectively, and a plurality of switches 31 to 35 relaying communication between a plurality of servers 36 to 39.

Here, the server 36 and the server 37 are connected with the switch 31, the server 38 is connected with the switch 32, and the server 39 is connected with the switch 33. Further, the switches 31 to 33 are connected with the switch 34 and the switch 35 of an upper level which relay communication between switches. In other words, in the system 30, the switches 31 to 35 are connected so that a plurality of communication paths involving a plurality of switches can be present among the servers 36 to 39.

In the system 30, for example, the VM #1 operated by the server 36 performs communication with the VM #3 operated by the server 38 through a path involving the switch 31, the switch 34, and the switch 32 or a path involving the switch 31, the switch 35, and the switch 32. Further, for example, the VM #2 operated by the server 37 performs communication with the VM #4 operated by the server 39 through a path involving the switch 31, the switch 35, and the switch 33 or a path involving the switch 31, the switch 34, and the switch 33.

Patent Document 1: Japanese Laid-open Patent Publication No. 2011-070549

However, in the VSI discovery protocol described above, a port profile is automatically set to a switch connected with a server. For this reason, there is a problem in that it is difficult to automatically set a port profile to switches connected at multiple levels.

For example, an example of moving the VM #4 operated by the server 39 to the server 38 will be described. In this case, the PRE-ASSOC message and the ASSOC message are exchanged between the server 38 and the switch 32, and the DE-ASSOC message is exchanged between the server 39 and the switch 33, so that the port profiles of the switch 33 and the switch 32 are automatically set.

However, the messages of the VSI discovery protocol are not transmitted to the switch 34 and the switch 35 of the upper level which relay communication between switches. For this reason, in the system 30, it is difficult to automatically set the port profiles of the switch 34 and the switch 35.

According to an aspect of the present invention, a port profile can be automatically set to switches connected at multiple levels.

SUMMARY

According to an aspect of the embodiments, a data relay device includes a memory and a processor coupled to the memory. The processor executes a data relay process includes receiving that receives a virtual machine identifier representing a virtual machine of a migration target and a setting request of a port profile from a sever connected with the computer. The data relay process includes determining that determining whether or not a storage device, which stores a virtual machine identifier of a virtual machine operated by the server connected with the computer and a port used by the virtual machine, stores the virtual machine identifier received by the receiving in association with another port. The data relay process includes transferring that transferes the setting request of the port profile to a data relay device of an upper level higher than the computer in a communication path through which the virtual machine represented by the virtual machine identifier performs communication when it is determined by the determining that the received virtual machine identifier is not stored in association with the other port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for describing an example of a switch according to the first embodiment;

FIG. 6 is a diagram for describing an example of a path table according to the first embodiment;

FIG. 7 is a diagram illustrating an example of information stored in a VSI table;

FIG. 8 is a diagram illustrating an example of information stored in a port profile table;

FIG. 9A is a first diagram for describing an example of information stored in a MAC table;

FIG. 9B is a second diagram for describing an example of information stored in a MAC table;

FIG. 9C is a third diagram for describing an example of information stored in a MAC table;

FIG. 9D is a fourth diagram for describing an example of information stored in a MAC table;

FIG. 9E is a fifth diagram for describing an example of information stored in a MAC table;

FIG. 11A is a first diagram for describing an example of a process of rewriting a MAC table;

FIG. 11B is a second diagram for describing an example of a process of rewriting a MAC table;

FIG. 11C is a third diagram for describing an example of a process of rewriting a MAC table;

FIG. 11D is a fourth diagram for describing an example of a process of rewriting a MAC table;

FIG. 11E is a fifth diagram for describing an example of a process of rewriting a MAC table;

FIG. 19 is a diagram for describing an example of pin group information according to the second embodiment;

DESCRIPTION OF EMBODIMENTS

Preferred embodiments will be explained with reference to accompanying drawings.

[a] First Embodiment

Figure 1:
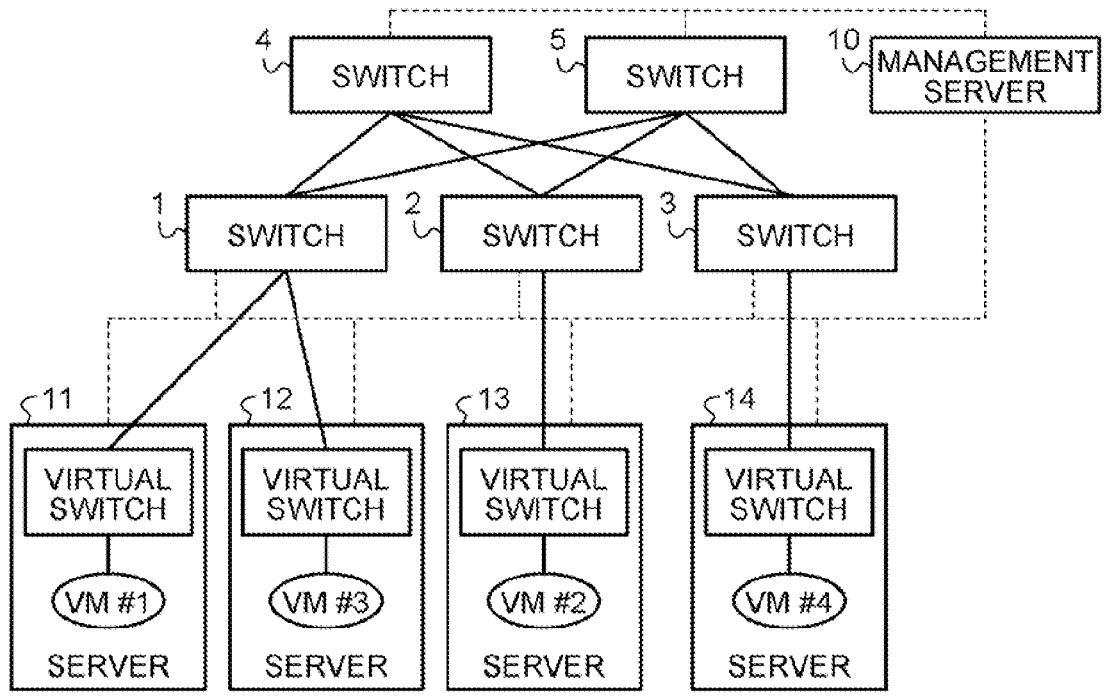
FIG. 1 is a diagram for describing an example of an information processing system according to a first embodiment.

In the following first embodiment, an example of an information processing system including a data relay device according to a first embodiment will be described with reference to FIG. 1. FIG. 1 is a diagram for describing an example of an information processing system according to the first embodiment.

As illustrated in FIG. 1, the information processing system includes a plurality of switches 1 to 5, a plurality of servers 11 to 14, and a management server 10. Here, the switches 1 to 3 are connected with the servers 11 to 14, and are lower-level switches. In the example illustrated in FIG. 1, the switch 1 is connected with the server 11 and the server 12, the switch 2 is connected with the server 13, and the switch 3 is connected with the server 14.

Further, each of the switch 4 and the switch 5 is connected with the switches 1 to 3, and is an upper-level switch that relays communication of the switches 1 to 3. In other words, the information processing system adopts a multipath technique in which a plurality of communication paths are presented among the servers 11 to 14.

Next, processes executed by each of the switches 1 to 5, the management server 10, and each of the servers 11 to 14 according to the first embodiment will be described. In the following, a process executed by each of the servers 11 to 14, a process executed by each of the switches 1 to 5, and a process executed by the management server 10 will be described in the described order.

First, the servers 11 to 14 will be described. Each of the servers 11 to 14 is an information processing apparatus that executes a virtual machine monitor (VMM) called a hypervisor and operates a VM. In the example illustrated in FIG. 1, the server 11 operates a VM #1, the server 12 operates a VM #3, the server 13 operates a VM #2, and the server 14 operates a VM #4. Further, each of the servers 11 to 14 operates a virtual switch, and relays communication among the VMs #1 to #4.

Further, when the VM (#1 to #4) is moved between servers according to an instruction of the management server 10, the server 11 to 14 transmits a message of the VSI discovery protocol to a switch connected with itself according to the VSI discovery protocol.

Specifically, the server 11 to 14 executes the following process when it serves as a destination server. In other words, the server 11 to 14 starts a pre-copy process of receiving data of a VM of a migration target, and transmits a PRE-ASSOC message for instructing setting preparation of a port profile related to the VM of the migration target. Further, the server 11 to 14 executes a stop and copy process when the pre-copy process ends.

Then, the server 11 to 14 executes the stop and copy process. Upon receiving the PRE-ASSOC-CONF message which is a response to the PRE-ASSOC message, the server 11 to 14 transmits a message for instructing setting application of port profile information. In other words, the server 11 to 14 transmits an ASSOC message to a switch connected with itself.

Further, the server 11 to 14 executes the following process when it serves as a source server. In other words, the server 11 to 14 starts a pre-copy process of transmitting data of a VM of a migration target, then stops the VM of the migration target, and executes a stop and copy process of transmitting all data related to the VM. Thereafter, the server 11 to 14 transmits a DE-ASSOC message to instruct deletion of a port profile related to a VM of a migration target.

In addition, the server 11 to 14 executes the following process when transmitting a message of the VSI discovery protocol. In other words, the server 11 to 14 transmits a path ID representing a communication path used to transmit or receive data of a VM of a migration target to a switch connected with itself together with the message of the VSI discovery protocol.

In detail, when an instruction to move a VM is given from the management server 10, the server 11 to 14 acquires a path ID related to the VM of the migration target from the management server 10. Then, the server 11 to 14 includes the path ID in a message defined by a type length value (TLV) format of the VSI discovery protocol, and transmits the message including the path ID to a switch. Then, the server 11 to 14 transmits the message including the path ID to a switch connected with itself.

Here, an example of the path ID is described. A path ID "1" is an identifier representing a communication path involving the switch 1, the switch 5, and the switch 3, and a path ID "2" is an identifier representing a communication path involving the switch 1, the switch 4, and the switch 2.

Next, the switches 1 to 5 will be described. The switches 2 to 5 execute the same process the switch 1, and thus the redundant description will not be repeated. The switch 1 is a switch that receives a packet including data from any one of the server 11, the server 12, the switch 4 of the upper level, the switch 5 of the upper level, and transfers the received packet to a packet destination.

Specifically, when a packet addressed to the server 13 or the server 14 is received from the server 11 or the server 12, the switch 1 transfers the received data to the switch 4 or the switch 5 based on a communication path represented by the path ID included in the packet. Further, when a packet addressed to an IP address of the server 11 or an IP address of the server 12 is received from the switch 4 or the switch 5, the switch 1 transfers the packet to the server 11 or the server 12.

For example, the switch 1 receives a packet including the IP address of the server 13 as the destination and the path ID "2" from the server 11. In this case, the switch 1 transfers the received packet to the switch 4. Further, the switch 1 receives a packet including the IP address of the server 12 as the destination and the path ID "1" from the switch 5. In this case, the switch 1 transfers the received packet to the server 12.

Here, the switch 1 stores port profiles of the VM #1 and the VM #3 operated by the servers 11 and 12 connected with itself, and executes transfer of a packet according to the stored port profiles. For example, the switch 1 includes a plurality of ports through which data is transmitted and received between the server 11 and the server 12. Further, the switch 1 stores port profile information in which each port is associated with the VM #1 or the VM #3. Then, the switch 1 performs transmission and reception of a packet based on the port profile information.

In other words, when a packet is received through a port associated with the VM #1, the switch 1 transfers the packet as the packet received from the VM #1. Further, when a packet is received through a port associated with the VM #3, the switch 1 transfers the packet as the packet received from the VM #3. In other words, when a packet addressed to the VM #1 is received, the switch 1 outputs the received packet through a port associated with the VM #1. Further, when a packet addressed to the VM #3 is received, the switch 1 outputs the received packet through a port associated with the VM #3.

Further, the switch 1 executes the following process when a message of the VSI discovery protocol is received from the server 11 or the server 12 connected with itself. In other words, the switch 1 determines whether or not the received message is the PRE-ASSOC message, the ASSOC message, or the DE-ASSOC message.

Then, the switch 1 executes the following process when the received message is the PRE-ASSOC message. The switch 1 determines whether or not virtual station interface identification (VSI ID) which is an identifier representing a VM which is a target of the received PRE-ASSOC message remains stored. In other words, the switch 1 determines whether or not a port profile of a VM related to the received VSI ID has been applied.

Here, the PRE-ASSOC message is a message transmitted from a destination server which is the destination of a VM. For this reason, when it is determined that a port profile of a VM related to the received VSI ID has been applied, the switch 1 can determine that a server other than the destination server among servers connected with itself is operating a VM of a migration target. As a result, when the VSI ID of the received PRE-ASSOC message remains stored, since there is no change in a communication path related to the VM of the migration target, the switch 1 needs not necessarily perform a port profile update on the switches 4 and 5 of the upper level.

For this reason, when the VSI ID of the received PRE-ASSOC message remains stored, the switch 1 acquires new port profile information from the management server 10, and executes port profile setting preparation according to the acquired port profile information. Then, the switch 1 transmits the PRE-ASSOC-CONF message which is a response to the PRE-ASSOC message to a transmission source server of the PRE-ASSOC message, that is, the destination server.

However, when the port profile of the VM related to the received VSI ID has not been applied, that is, when the VSI ID of the PRE-ASSOC message does not remain stored, the switch 1 can determine that a server not connected with itself is operating the VM of the migration target. In other words, since the communication path related to the VM of the migration target has been changed, the switch 1 determines that a port profile update needs to be performed even on the switches 4 and 5 of the upper level.

As a result, when the VSI ID of the received PRE-ASSOC message does not remain stored, the switch 1 executes the following process. The switch 1 acquires new port profile information from the management server 10, and executes port profile setting preparation according to the acquired port profile information.

Further, the switch 1 acquires the path ID from the received PRE-ASSOC message, determines an upper-level switch which is at a level higher than itself in the communication path represented by the acquired path ID, and transfers the PRE-ASSOC message to the determined switch. Then, when the PRE-ASSOC-CONF message is received from the switch to which the PRE-ASSOC message has been transferred, the switch 1 transmits the PRE-ASSOC-CONF message to the destination server. However, when there is no upper-level switch which is at a level higher than itself in the communication path represented by the acquired path ID, the switch 1 transmits the PRE-ASSOC-CONF message to the transmission source of the PRE-ASSOC message.

Further, when the ASSOC message is received from the destination server, the switch 1 determines whether or not the VSI ID remains stored in association with another port. When the VSI ID remains stored in association with another port, a port profile for which setting preparation is completed is applied. In other words, the switch 1 determines whether or not the VSI ID represented by the received ASSOC message remains stored in association with a port different from a port through which the ASSOC message has been received. When the VSI ID remains stored in association with a different port, a port profile for which setting preparation is completed is applied. Then, the switch 1 transmits the ASSOC-CONF message which is a response to the ASSOC message to the destination server.

Further, when the VSI ID of the ASSOC message does not remain stored in association with another port, the switch 1 transfers the ASSOC message to an upper-level switch which is at a level higher than itself in the communication path represented by the path ID without applying the port profile. Further, when the ASSOC-CONF message is received from a switch of the upper level, the switch 1 applies the port profile, and transfers the received ASSOC-CONF message to the transmission destination server.

Further, when the DE-ASSOC message is received from the source server, the switch 1 acquires the path ID from the DE-ASSOC message. Then, when the VSI ID of the DE-ASSOC message remains stored in association with another port, the switch 1 deletes the port profile, and transmits the DE-ASSOC-CONF message to the source server. Further, when the VSI ID of the DE-ASSOC message does not remain stored in association with another port, the switch 1 determines an upper-level switch which is at a level higher than itself in a communication path represented by the acquired path ID, and transfers the DE-ASSOC message to the determined switch.

Thereafter, when the DE-ASSOC-CONF message which is a response to the DE-ASSOC message is received from an upper-level switch which is at a level higher than itself, the switch 1 deletes the port profile, and transmits the DE-ASSOC-CONF message to the source server. Further, when there is no upper-level switch which is at a level higher than itself in a communication path represented by the acquired path ID, the switch 1 deletes the port profile, and transmits the DE-ASSOC-CONF message which is a response to the DE-ASSOC message to the source server.

In other words, the switch 1 performs a port profile update according to the VSI discovery protocol when migration of a VM is performed between itself and a server connected with itself. However, when migration of a VM is performed between a server connected with itself and a server not connected with itself, the switch 1 acquires the path ID included in the message, and determines an upper-level switch which is at a level higher than itself in the communication path represented by the path ID. Then, the switch 1 transfers the received message to the determined switch. Thereafter, the switch 1 receives a response to each message from a switch of the upper level, and then transmits a response of each message to a server which is a transmission source of each message.

The management server 10 is a server that manages each of the switches 1 to 5 and each of the servers 11 to 14. For example, the management server 10 is connected with each of the switches 1 to 5 and each of the servers 11 to 14 through a management network indicated by a dotted line in FIG. 1. Further, the management server 10 instructs the servers 11 to 14 to perform, for example, an activation process or a stop process of activating the VMs #1 to #4, respectively, through the management network.

Further, the management server 10 stores port profile information applied to each of the switches 1 to 5. For example, the management server 10 stores an operation environment of a VM in association with a VM operated by each of the servers 11 to 14. Further, the management server 10 stores information such as VLAN, QoS, or allocated band, which corresponds to a VM.

Further, the management server 10 calculates a server that efficiently operates each of the VMs #1 to #4 based on a usage rate of a central processing unit (CPU) in each of the servers 11 to 14, a traffic volume in a communication path, power consumption of each of the servers 11 to 14, and the like. Further, when any one VM is moved to another server, the management server 10 instructs a source sever and a destination server to execute a VM migration process according to migration of the VM. Further, when the VM is moved, the management server 10 recalculates an optimal communication path in which communication among the VMs #1 to #4 is relayed, and then calculates port profile information for applying a new port profile to each of the switches 1 to 5 based on a calculation result.

A process of calculating a server for operating each of the VMs #1 to #4 or a technique of calculating a new communication path, which is executed by the management server 10, is merely exemplary, and the management server 10 may calculate a new server and a new communication path using an arbitrary technique.

Figure 2:
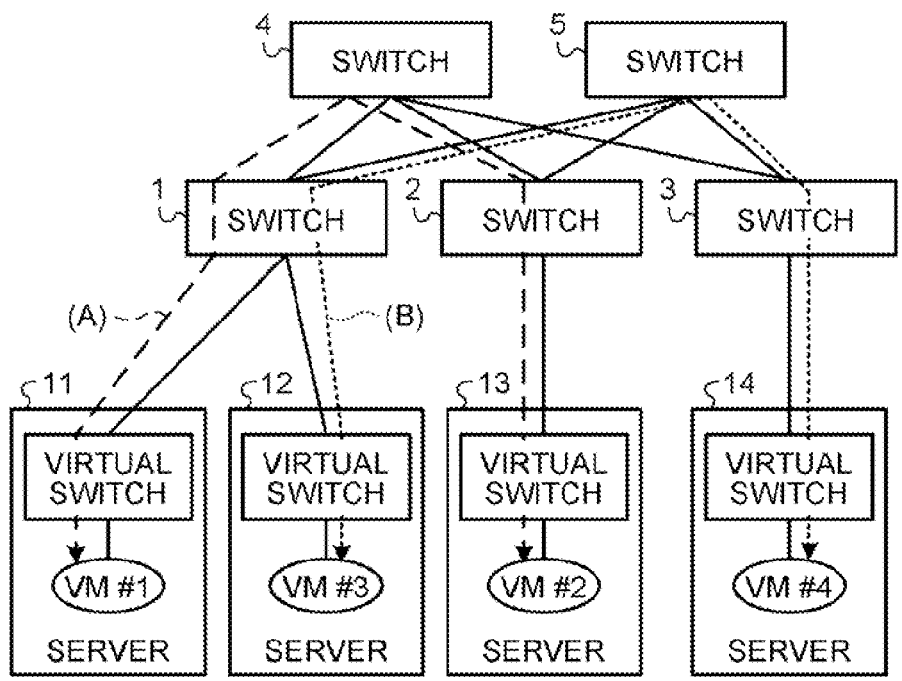
FIG. 2 is a diagram for describing an example in which a switch transfers data based on the path ID.

Next, an example of a process will be described in which each of the switches 1 to 5 relays data of each of the VMs #1 to #4 based on the port profile information and the path ID generated by the management server 10. FIG. 2 is a diagram for describing an example in which a switch transfers data based on the path ID.

In the example illustrated in FIG. 2, the management server 10 generates port profile information causing communication between the VM #1 and the VM #2 to be performed in a communication path of the path ID "2" involving the switch 1, the switch 4, the switch 2 as indicated by a dotted line (A) in FIG. 2. Further, the management server 10 generates port profile information causing communication between the VM #3 and the VM #4 to be performed in a communication path of the path ID "1" involving the switch 1, the switch 5, and the switch 3 as indicated by a dotted line (B) in FIG. 2.

In this case, each of the switches 1 to 5 acquires the port profile information generated by the management server 10, and then applies its port profile using the acquired port profile information. As a result, for example, when a packet to be transmitted from the VM #1 to the VM #2 is received from the server 11, the switch 1 transfers the received packet to the switch 4. The switch 4 transfers the packet to be transmitted from the VM #1 to the VM #2 to the switch 2. Then, the switch 2 transfers the packet to be transmitted from the VM #1 to the VM #2 to the server 13.

Further, for example, when a packet to be transmitted from the VM #3 to the VM #4 is received from the server 12, the switch 1 transfers the received packet to the switch 5. The switch 5 transfers the packet to be transmitted from the VM #3 to the VM #4 to the switch 3. Then, the switch 3 transfers the packet to be transmitted from the VM #3 to the VM #4 to the server 14.

Figure 3:
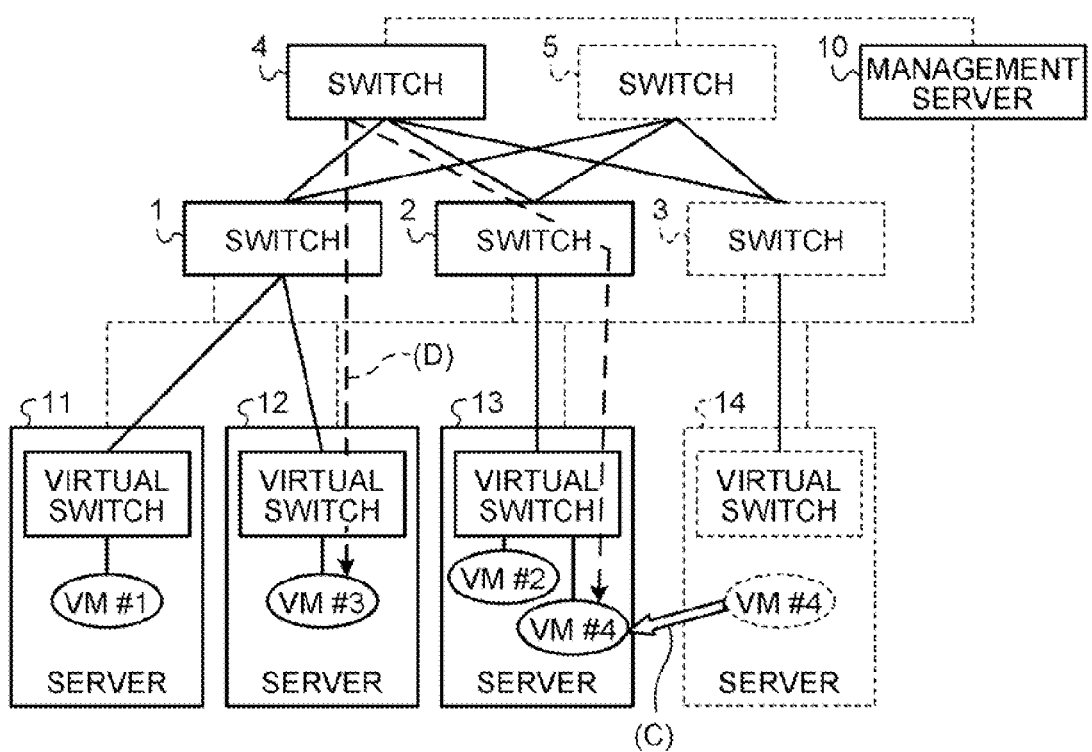
FIG. 3 is a diagram for describing an example of a process performed when a virtual machine is moved.

Next, an example in which the server 14 moves the VM #4 being operated by the server 14 to the server 13 will be described with reference to FIGS. 2 and 3. FIG. 3 is a diagram for describing an example of a process performed when a virtual machine is moved. For example, in the example illustrated in FIG. 2, it is assumed that the VM #1 uses a band of 10 Giga bit per second (Gbps), the VM #3 uses a band of 10 Gbps, and the VM #2 uses a band of 5 Gbps.

Further, it is assumed that the CPU usage rates of the server 11 and the server 12 are 100%, and the CPU usage rate of the server 13 is 50%. Further, it is assumed that before migration, the VM #4 uses a band of 10 Gbps, and the CPU usage rate of the server 14 is 100%. Furthermore, it is assumed that communication of a maximum of 10 Gbps can be performed between each of the switches 1 to 5 and each of the servers 11 to 14.

In this case, communication is performed at a maximum bandwidth of 5 Gbps in the communication path indicated by the dotted line (A) in FIG. 2, that is, in the communication path between the VM #1 and the VM #2. Further, communication is performed at a maximum bandwidth of 10 Gbps in the communication path indicated by the dotted line (B) in FIG. 2, that is, in the communication path between the VM #3 and the VM #4.

In the example illustrated in FIG. 3, it is assumed that a band used by the VM #4 is 5 Gbps, and the CPU usage rate of the server 14 is 50%. In this case, the management server 10 can determines that communication among the VMs #1 to #4 can be continued even though the VM #4 is moved to the server 13 as indicated by (C) in FIG. 3, and the switch 3, the switch 5, and the server 14 are slept.

For this reason, the management server 10 calculates a new communication path between the VM #3 and the VM #4. In the example illustrated in FIG. 3, the management server 10 sets a communication path involving the switch 1, the switch 4, and the switch 2 as indicated by (D) in FIG. 3, that is, a communication path represented by the path ID "2" as a new communication path used for communication between the VM #3 and the VM #4.

Then, the management server 10 generates port profile information which is set to allow the switch 1, the switch 4, and the switch 2 to relay communication between the VM #3 and the VM #4. Further, the management server 10 instructs the server 13 to transmit the PRE-ASSOC message and the ASSOC message which include the path ID "2" representing the new communication path. Further, the management server 10 instructs the server 14 to transmit the DE-ASSOC message including the path ID "1."

In this case, the destination server 13 transmits the PRE-ASSOC message including the path ID "2" to the switch 2, and the VSI ID of the VM #4. In this case, since the switch 2 does not store the VSI ID of the VM #4, the switch 2 acquires port profile information related to the VM #4 from the management server 10, performs application preparation, and determines the switch 4 which is at a level higher than itself in the communication path represented by the path ID "2." Then, the switch 2 transmits the PRE-ASSOC message to the switch 4.

When the PRE-ASSOC message is received from the switch 2, the switch 4 acquires port profile information from the management server 10, and performs application preparation. Further, since there is no upper-level switch which is at a level higher than itself in the communication path represented by the path ID "2," the switch 4 transmits the PRE-ASSOC-CONF message to the switch 2. The switch 2 transmits the PRE-ASSOC-CONF message to the server 13.

In this case, the server 13 transmits the ASSOC message including the path ID "2" to the switch 2. Thus, the switch 2 transmits the ASSOC message to the switch 4. Since there is no upper-level switch which is at a level higher than itself in the communication path represented by the path ID "2," the switch 4 applies the port profile, and transmits the ASSOC-CONF message to the switch 2. Then, when the ASSOC-CONF message is received from the switch 4, the switch 2 applies the port profile, and transmits the ASSOC-CONF message to the server 13.

Further, the server 14 which is the transmission source server transmits the DE-ASSOC message including the path ID "1" and the VSI ID of the VM #4. In this case, the switch 3 transmits the DE-ASSOC message to the switch 5 which is at a level higher than itself in the communication path represented by the path ID "1 ." Thus, since there is no upper-level switch which is at a level higher than itself in the communication path represented by the path ID "1 ," the switch 5 deletes the port profile related to the VM #4, and transmits the DE-ASSOC-CONF message to the switch 3. When the DE-ASSOC-CONF message is received from the switch 5, the switch 3 deletes the port profile, and transmits the DE-ASSOC-CONF message to the server 14.

As described above, each of the switches 1 to 5 executes the profile setting process or the profile deletion process within its own device when live migration of a VM is performed between itself and a server connected to itself. Further, each of the switches 1 to 5 transfers each message to an upper-level switch which is at a level higher than itself in the communication path represented by the path ID included in each message when it is determined that live migration of a VM involves itself.

In other words, each of the switches 1 to 5 causes various messages related to the VSI discovery protocol to reach an upper-level switch. As a result, each of the switches 1 to 5 can automatically set a port profile. Further, each of the switches 1 to 5 performs transmission to an upper-level switch in a communication path of a VM of a migration target using a path ID included in each message, and thus a port profile can be appropriately and automatically set.

Figure 4:
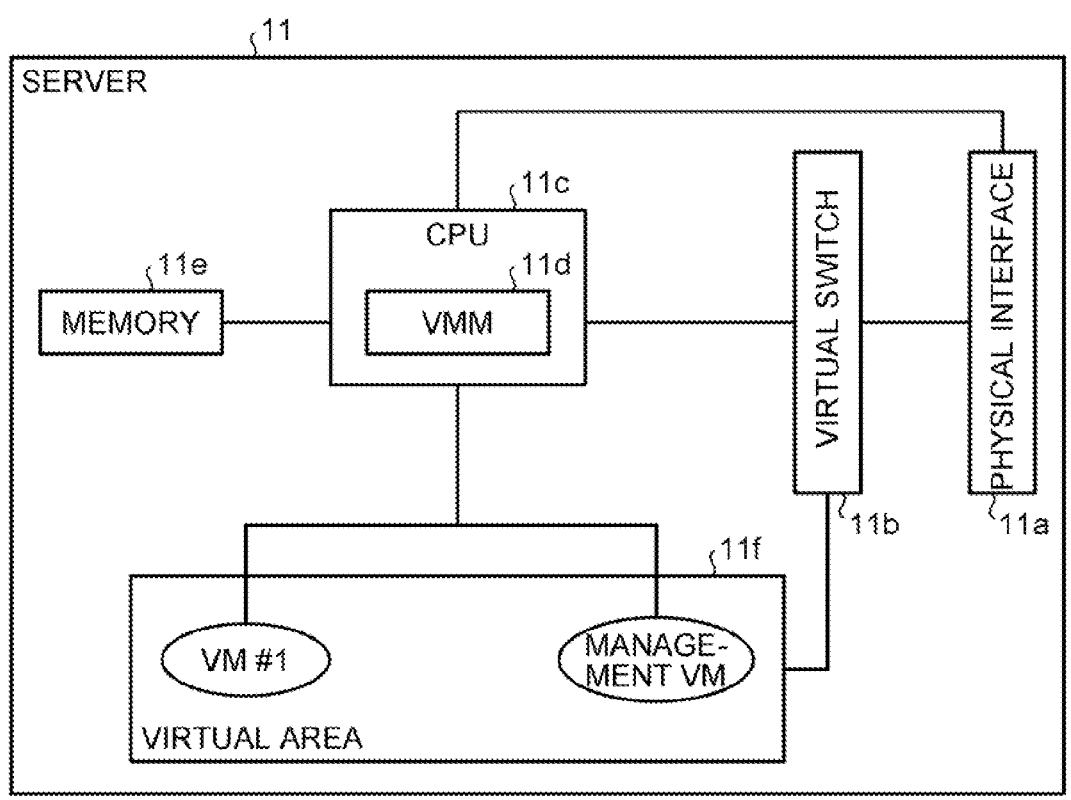
FIG. 4 is a block diagram illustrating a configuration of a server according to the first embodiment.

Next, an example of the server 11 will be described with reference to FIG. 4. FIG. 4 is a block diagram illustrating a configuration of a server according to the first embodiment. As illustrated in FIG. 4, the server 11 includes a physical interface 11a, a virtual switch 11b, a CPU 11c, a memory 11e, and a virtual area 11f. The CPU 11c operates a VMM 11d. The configuration of the server illustrated herein is merely exemplary and is not limited to this example. For example, the server may include an system controller (SC) or a memory access controller (MAC).

The physical interface 11a is an network interface card (NIC) that includes at least one port and controls communication with another server or VM. For example, the physical interface 11a transmits the PRE-ASSOC message, the ASSOC message, and the DE-ASSOC message of the VSI discovery protocol to the switch 1. The physical interface 11a receives the PRE-ASSOC-CONF message, the ASSOC-CONF message, and the DE-ASSOC-CONF message of the VSI discovery protocol through the switch 1.

The virtual switch 11b is a switch which is virtually generated by the VMM 11d, and controls communication between VMs or communication between a VM and the outside. For example, when the VM #1 operated by the server 11 transmits data addressed to the VM #2 operated by the server 13, the virtual switch 11b receives the data and outputs the data to the physical interface 11a. Further, when the VM #2 operated by the server 13 transmits data addressed to the VM #1 operated by the server 11, the virtual switch 11b receives the data through the physical interface 11a and outputs the data to the VM #1. In this way, communication can be performed between the VM #1 and the VM #2.

The CPU 11c includes an internal memory that stores a control program such as an operating system (OS), a program specifying various processing procedures and the like, and any data for processing, and executes various processes by executing the VMM 11d.

The VMM 11d is software of executing various controls related to a VM such as creation, deletion, activation, and stop of a VM, and executes, for example, live migration. For example, when a VM creation instruction is received from an administrator terminal, the management server 10, or the like, the VMM 11d creates a VM in the virtual area 11f. Further, when a VM deletion instruction is received from the administrator terminal, the management server 10, or the like, the VMM 11d deletes a corresponding VM from the virtual area 11f. Further, when a VM activation instruction is received from the administrator terminal, the management server 10, or the like, the VMM 11d activates a corresponding VM on the virtual area 11f. Further, when a VM stop instruction is received from the administrator terminal, the management server 10, or the like, the VMM 11d stops a corresponding VM on the virtual area 11f.

Further, when pre-copy is received from another server, the VMM 11d executes the pre-copy process in conjunction with the corresponding other server. In addition, the VMM 11d acquires a path ID representing a new communication path of a VM of a migration target from the management server 10 through the physical interface 11a, and transmits the PRE-ASSOC message including the acquired path ID to the switch 1. Thereafter, the VMM 11d receives the PRE-ASSOC-CONF message of the VSI discovery protocol through the physical interface 11a.

Further, when a stop and copy is received from another server, the VMM 11d executes the stop and copy process in conjunction with the corresponding other server. In addition, the VMM 11d transmits the ASSOC message including the path ID to the switch 1 through the physical interface 11a. Thereafter, the VMM 11d receives the ASSOC-CONF message of the VSI discovery protocol through the physical interface 11a.

Further, when the VM deletion instruction is received from the administrator terminal, the management server, or the like, the VMM 11d acquires a path ID representing a communication path of a VM which is a deletion target from the management server 10 through the physical interface 11a. Then, the VMM 11d transmits the DE-ASSOC message including the acquired path ID to the switch 1. Thereafter, the VMM 11d receives the DE-ASSOC-CONF message of the VSI discovery protocol through the physical interface 11a.

The virtual area 11f is an area for operating a VM generated by the VMM 11d, and can activate an arbitrary number of VMs. For example, the VM #1 which is a virtual server and a management VM which is a management domain for managing the virtual server of the VM #1 are executed in the virtual area 11f. The VM #1 executes processing using a virtual memory or a virtual processor. For example, the virtual memory is implemented by allocating a predetermined area in the memory 11e as a memory used by the VM #1.

The memory 11e is a storage device such as a semiconductor memory device that stores data and a program to be processed by the CPU 11c which will be described later. For example the memory 11e is used for allocation of virtual memory.

Next, an example of each of the switches 1 to 5 will be described with reference to FIG. 5. FIG. 5 is a diagram for describing an example of a switch according to the first embodiment. As illustrated in FIG. 5, the switch 1 includes a path table 15, a VSI table 16, a port profile table 17, and a media access control (MAC) table 18. The switch 1 further includes a communication control I/F unit 19 and a control unit 20.

The control unit 20 includes a message processing unit 21, a learning unit 26, and a switching control unit 27. The message processing unit 21 includes a receiving unit 22, a determining unit 23, an executing unit 24, and a transfer unit 25.

Next, the respective units 15 to 27 included in the switch 1 will be described. The path table 15 stores a path ID representing a communication path related to a VM operated by the server 11 or the server 12 connected with the switch 1. FIG. 6 is a diagram for describing an example of a path table according to the first embodiment. In the example illustrated in FIG. 6, the path table 15 stores a MAC address of a VM, a path ID, and a path in association with one another.

For example, in the example illustrated in FIG. 6, the path table 15 stores a MAC address "MAC3" of the VM #3 operated by the server 12, a path ID "1 ," a path "1,5,3" in association with one another. Here, the path "1,5,3" is information representing a communication path involving the switch 1, the switch 5, and the switch 3. Further, in the example illustrated in FIG. 6, the path table 15 stores a MAC address "MAC1" of the VM #1 operated by the server 11, a path ID "2," a path "1,4,2" in association with one another. Here, the path "1,4,2" is information representing a communication path involving the switch 1, the switch 4, and the switch 2.

The VSI table 16 stores port profile allocation information. Information stored in the VSI table 16 is stored or deleted by the executing unit 24 which will be described later. FIG. 7 is a diagram illustrating an example of information stored in the VSI table. As illustrated in FIG. 7, the VSI table 16 stores "VSI ID," "port profile ID," "VSI State," and "port number" in association with one another. Information stored in the VSI table 16 is not limited to information illustrated in FIG. 7 and can be arbitrarily added or deleted.

Here, the stored "VSI ID" is an identifier representing a VM, and the "port profile ID" is an identifier representing a port profile to apply. The "VSI State" represents a state of a port profile, and the "port number" represents a port number allocated by a port profile, that is, a port number used by a VM.

In the example illustrated in FIG. 7, the VM #1 uses a port P1, and is in a state in which a port profile having a port profile ID (=1) corresponding to the VM #1 has been acquired from the management server 10. Further, the VM #3 uses a port P2, and is in a state in which a port profile having a port profile ID (=2) corresponding to the VM #3 has been allocated to P2.

Referring back to FIG. 5, the port profile table 17 is a storage unit that caches information acquired from the management server 10. Information stored in the port profile table 17 is stored or deleted by the executing unit 24 which will be described later. FIG. 8 is a diagram illustrating an example of information stored in the port profile table. As illustrated in FIG. 8, the port profile table 17 stores "1, VLAN100, 50 MB," "2, VLAN200, 100 MB," and the like as "port profile ID, VLAN, band information." Information stored in the port profile table 17 is not limited to information illustrated in FIG. 8 and can be arbitrarily added or deleted.

Here, the stored "port profile ID" is an identifier representing a port profile, the "VLAN" represents a VLAN to which a port whose profile remains set belongs to, and the "band information" represents a band allocated to a corresponding port. In case of FIG. 8, the port profile of the port profile ID=1 represents that a bandwidth of 50 MB using the VLAN of VLAN100 is set to a port. In other words, the VM #1 using this port performs communication with a bandwidth of 50 MB using the VLAN of VLAN100.

Similarly, the port profile of the port profile ID=2 represents that a bandwidth of 100 MB using the VLAN of VLAN200 is set to a port. In other words, the VM #3 using this port performs communication with a bandwidth of 100 MB using the VLAN of VLAN200.

Referring back to FIG. 5, the MAC table 18 stores a MAC address of a server which has been subjected to learning by the learning unit 26 which will be described later in associa-tion with a relay destination. Information stored in the MAC table 18 is stored or deleted by the learning unit 26 which will be described later.

Next, an example of information stored in a MAC table included in each of the switches 1 to 5 will be described with reference to FIGS. 9A to 9E. FIG. 9A is a first diagram for describing an example of information stored in a MAC table. FIG. 9B is a second diagram for describing an example of information stored in a MAC table. FIG. 9C is a third diagram for describing an example of information stored in a MAC table. FIG. 9D is a fourth diagram for describing an example of information stored in a MAC table. FIG. 9E is a fifth diagram for describing an example of information stored in a MAC table.

FIG. 9A is assumed to illustrate an example of a MAC table included in the switch 1. FIG. 9B is assumed to illustrate an example of a MAC table included in the switch 2. FIG. 9C is assumed to illustrate an example of a MAC table included in the switch 3. FIG. 9D is assumed to illustrate an example of a MAC table included in the switch 4. FIG. 9E is assumed to illustrate an example of a MAC table included in the switch 5. Information stored in the MAC table 18 is not limited to information illustrated in FIGS. 9A to 9E and can be arbitrarily added or deleted.

For example, in the example illustrated in FIG. 9A, the MAC table 18 stores "MAC1, server 11," "MAC2, switch 4," "MAC3, server 12," "MAC4, switch 5," and the like as "MAC address, relay destination." Here, the stored the "MAC address" is a MAC address of a transmission destination included in data (packet) received through the communication control I/F unit 19, and is a learned MAC address. The "relay destination" is information representing a transfer destination to which a received packet is transferred.

In the example illustrated in FIG. 9A, the MAC table 18 included in the switch 1 represents that a packet having "MAC1" as a destination MAC address is transferred to the server 11, and a packet having "MAC2" as a destination MAC address is transferred to the switch 4. Further, in the example illustrated in FIG. 9A, the MAC table 18 included in the switch 1 represents that a packet having "MAC3" as a destination MAC address is transferred to the server 12, and a packet having "MAC4" as a destination MAC address is transferred to the switch 5.

Further, in the example illustrated in FIG. 9B, the MAC table included in the switch 2 represents that a packet having "MAC1" as a destination MAC address is transferred to the switch 4, and a packet having "MAC2" as a destination MAC address is transferred to the server 13. Further, in the example illustrated in FIG. 9C, the MAC table included in the switch 3 represents that a packet having "MAC3" as a destination MAC address is transferred to the switch 5, and a packet having "MAC4" as a destination MAC address is transferred to the server 14.

Further, in the example illustrated in FIG. 9D, the MAC table included in the switch 4 represents that a packet having "MAC1" as a destination MAC address is transferred to the switch 1, and a packet having "MAC2" as a destination MAC address is transferred to the switch 2. Further, in the example illustrated in FIG. 9E, the MAC table included in the switch 5 represents that a packet having "MAC3" as a destination MAC address is transferred to the switch 1, and a packet having "MAC4" as a destination MAC address is transferred to the switch 3.

Referring back to FIG. 5, the communication control I/F unit 19 is an NIC that includes at least one port and controls communication with another server or communication with the switch 4 or the switch 5 of the upper level. For example, the communication control I/F unit 19 receives the PRE-ASSOC message, the ASSOC message, and the DE-ASSOC message from each server 11, and outputs the messages to the control unit 20.

Further, the communication control I/F unit 19 transmits the PRE-ASSOC-CONF message, the ASSOC-CONF message, and the DE-ASSOC-CONF message output from the control unit 20 to a server of a request source. Further, the communication control I/F unit 19 transfers the PRE-ASSOC-CONF message, the ASSOC-CONF message, and the DE-ASSOC-CONF message transmitted from the switch 4 or the switch 5 to a server of a request source.

Further, when a path change message to instruct an update of the MAC table 18 which is transmitted in a broadcast manner is received, the communication control I/F unit 19 outputs the received path change message to the learning unit 26. Further, when a notice representing that the path change message is transmitted in a broadcast manner is acquired from the learning unit 26, the communication control I/F unit 19 broadcasts the acquired path change message to lower-level switches.

For example, the control unit 20 includes an electronic circuit such as a CPU or an micro processing unit (MPU). The control unit 20 includes internal memory that stores a program various processing procedures and the like, and data for processing. Further, the control unit 20 includes the message processing unit 21, the learning unit 26, and the switching control unit 27 and executes various processes through these units.

The message processing unit 21 executes various processes in response to a message, which conforms to the VSI discovery protocol, received from a server. Next, a description will be made in connection with an example of a process executed by the receiving unit 22, the determining unit 23, the executing unit 24, and the transfer unit 25 which are included in the message processing unit 21.

The receiving unit 22 receives a setting request of port profile information corresponding to a VM from a destination server to which the VM of the migration target is to be moved. Further, the receiving unit 22 receives a deletion request of port profile information corresponding to a corresponding VM from a source server operating the corresponding VM.

For example, when the PRE-ASSOC message is received from a server which is a destination of a VM, the receiving unit 22 outputs the received message to the determining unit 23. Similarly, when the DE-ASSOC message is received from a server which is a source of a VM, the receiving unit 22 outputs the received message to the determining unit 23. Further, when the ASSOC message is received from a server which is a destination of a VM, the receiving unit 22 outputs the received message to the determining unit 23.

Further, when the PRE-ASSOC-CONF message is received from the switch 4 or the switch 5 of the upper level, the receiving unit 22 outputs the received message to the transfer unit 25. Further, when the ASSOC-CONF message or the DE-ASSOC-CONF message is received from the switch 4 or the switch 5 of the upper level, the receiving unit 22 outputs the received message to the transfer unit 25, and outputs the fact that each response has been received to the executing unit 24.

Figure 10:
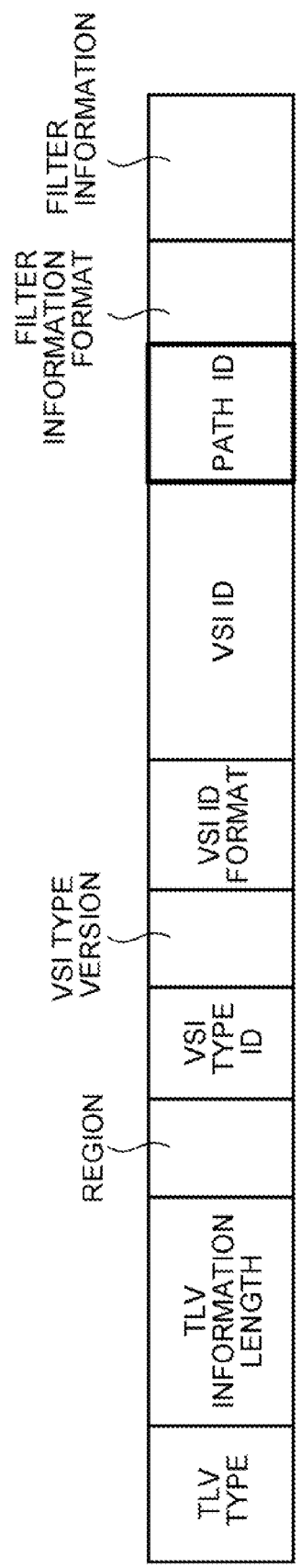
FIG. 10 is a diagram illustrating an example of a message used in a VSI discovery protocol.

For example, the receiving unit 22 receives a message specified by a TLV format illustrated in FIG. 10. FIG. 10 is a diagram illustrating an example of a message used in the VSI discovery protocol. In the example illustrated in FIG. 10, a message format includes a 7-bit TLV type field, a 9-bit TLV information length field, a 1-octet region field, and a 3-octet VSI type ID field.

The message format further includes a 1-octet VSI type version field, a 1-octet VSI ID format field, and a 16-octet VSI ID field. The message format further includes a 1-octet path ID field as indicated in a range surrounded by a thick line in FIG. 10. The message format further includes a 1-octet filter information format field and filter information field of an arbitrary size.

Here, the TLV type field and the TLV information length field are used as a TLV header, and The VSI ID format field, the VSI ID field, and the path ID field are used as a VSI Type and Instance. Further, the filter information format field and the filter information field are used as Filter Info. Further, information following a region is a TLV information string. In other words, the message format is configured such that a TLV information string which is detailed information of a message is added to a 16-bit TLV header.

Here, information representing any one of "PRE-ASSOC," "ASSOC," and "DE-ASSOC" as the type of a message is included in the TLV type field. Further, the port profile ID is included in the VSI Type ID field. Further, a VSI ID of a VM of a migration target is included in the VSI ID field. Further, a path ID representing a communication path related to a VM of a migration target is included in the path ID field.

When the message illustrated in FIG. 10 is received, the receiving unit 22 determines the type of message as any one of "PRE-ASSOC," "ASSOC," and "DE-ASSOC" with reference to information included in the TLV type field of the received message.

Referring back to FIG. 5, the determining unit 23 determines whether or not a VSI ID included in a setting request received from the receiving unit 22 remains stored in the VSI table 16 that stores a VSI ID used to identify a VM. Further, the determining unit 23 determines whether or not a VSI ID included in a deletion request received from the receiving unit 22 remains stored in the VSI table 16 that stores a VSI ID used to identify a VM.

For example, when a message in which either of PRE-ASSOC and ASSOC is described in the TLV type field of the message illustrated in FIG. 10 is received, the determining unit 23 executes the following process. The determining unit 23 acquires a VSI ID included in the VSI type ID field of the received message.

Subsequently, the determining unit 23 determines whether or not the VSI ID acquired from the message remains stored in the VSI table 16. Then, when the VSI ID remains stored in the VSI table 16, the determining unit 23 determines that migration of a VM does not involve the switch 1, and then outputs a notice representing that migration of a VM does not involve the switch 1 and the corresponding message to the executing unit 24. However, when the VSI ID does not remain stored in the VSI table 16, the determining unit 23 determines that migration of a VM involves the switch 1, and then executes the following process.

The determining unit 23 refers to a path ID included in the message, and acquires a communication path represented by the referred path ID from the management server 10. Then, the determining unit 23 determines whether or not there is an upper-level switch which is at a level higher than itself in the acquired communication path, that is, whether or not there is an upper-level switch which is at a level higher than the switch 1 in the acquired communication path.

Thereafter, when it is determined that there is an upper-level switch which is at a level higher than the switch 1, the determining unit 23 outputs information representing the determined upper-level switch, information representing transfer of the received message, and the received message to the transfer unit 25 for the determined upper-level switch.

Further, the determining unit 23 outputs a notice representing that migration of a VM involves the switch 1 and the received message to the transfer unit 25.

Further, when the received message is "DE-ASSOC," the determining unit 23 refers to a path ID included in the message, and acquires a communication path stored in association with the referred path ID from the path table 15. Then, the determining unit 23 determines an upper-level switch which is at a level higher than itself, information representing transfer of the received message, and the received message to the transfer unit 25. Further, the determining unit 23 outputs a notice representing that migration of a VM involves the switch 1 and the received message to the executing unit 24.

Further, when it is determined that a VSI ID included in the PRE-ASSOC message remains stored, the determining unit 23 stores the corresponding VSI ID and the determination result in memory or the like in association with each other. Then, in this state, when the ASSOC message or the DE-ASSOC message including the VSI ID whose determination result is stored in memory or the like is received, the determining unit 23 may output the corresponding message to the executing unit 24 without performing a determination about whether or not a VSI ID remains stored.

In other words, since the ASSOC message or the DE-ASSOC message is received in a state in which it is determined that migration of a VM does not involve the switch 1, the determining unit 23 determines that operation is being operated in the same blade server as a VM of a deletion target, and outputs the corresponding message to the executing unit 24. Similarly, when the ASSOC message or the DE-ASSOC message is received in a state in which it is determined that a VSI ID included in the PRE-ASSOC message does not remain stored, the determining unit 23 outputs the corresponding message to the switch 4 or the switch 5 of the upper level without executing a determination of the VSI ID.

Further, when it is determined that migration of a VM involves the switch 1, and there is no upper-level switch which is at a level higher than the switch 1 in the communication path represented by the path ID, the determining unit 23 notifies the learning unit 26 of the path ID.

When the determining unit 23 determines that the VSI ID included in the message remains stored in the VSI table 16, that is, when a notice representing that migration of a VM does not involve the switch 1 is acquired from the determining unit 23, the executing unit 24 executes a process corresponding to the setting request. For example, when the determining unit 23 determines that the VSI ID included in the PRE-ASSOC message remains stored, the executing unit 24 acquires a port profile corresponding to the corresponding VSI ID from the management server 10, and stores the acquired port profile in the port profile table 17.

In addition, the executing unit 24 stores the acquired port profile ID, a port number through which a message has been received, and a VSI ID included in the corresponding message in the VSI table 16 in association with one another, and sets "FETCHED" as the "VSI State." Then, the executing unit 24 transmits the PRE-ASSOC-CONF message representing storage of a port profile to the transmission source server of the PRE-ASSOC message in response to the PRE-ASSOC message.

Thereafter, when the ASSOC message is received from the determining unit 23, the executing unit 24 specifies a port profile corresponding to the corresponding VSI ID with reference to the VSI table 16. Subsequently, the executing unit 24 changes "VSI State" of the specified port profile from "FETCHED" to "ACTIVE." Then, the executing unit 24 transmits the ASSOC-CONF message representing completion of the port profile setting change to the transmission source server of the ASSOC message in response to the ASSOC message.

Further, when the determining unit 23 determines that a VSI ID included in the DE-ASSOC message remains stored, the executing unit 24 extracts the VSI ID included in the corresponding message. Then, the executing unit 24 specifies a port profile corresponding to the extracted VSI ID with reference to the VSI table 16, and then deletes the specified port profile. Then, the executing unit 24 transmits the DE-ASSOC-CONF message representing completion of port profile deletion to the transmission source server of the DE-ASSOC message in response to the DE-ASSOC message.

However, when the determining unit 23 determines that a VSI ID included in a received message does not remain stored in the VSI table 16, that is, when a notice representing that migration of a VM involves the switch 1 is acquired from the determining unit 23, the executing unit 24 executes the following process. For example, when the received message is the PRE-ASSOC message, the executing unit 24 acquires a port profile corresponding to the corresponding VSI ID from the management server 10, and then stores the acquired port profile in the port profile table 17.

In addition, the executing unit 24 stores the acquired port profile ID, a port number through which a message has been received, and a VSI ID included in the corresponding message in the VSI table 16 in association with one another, and sets "FETCHED" as the "VSI State." Then, the executing unit 24 ends the process without transmitting the PRE-ASSOC-CONF message.

Further, when a notice representing that migration of a VM involves the switch 1 and the ASSOC message are acquired from the determining unit 23, the executing unit 24 executes the following process. In other words, the executing unit 24 acquires a VSI ID included in the ASSOC message, and specifies a port profile corresponding to the acquired VSI ID with reference to the VSI table 16. Then, when a notice representing reception of the ASSOC-CONF message is acquired from the receiving unit 22, the executing unit 24 changes "VSI State" of the specified port profile from "FETCHED" to "ACTIVE." In other words, after the ASSOC-CONF message is received from an upper-level switch, the executing unit 24 validates the specified port profile.

Further, when a notice representing that migration of a VM involves the switch 1 and the DE-ASSOC message are acquired from the determining unit 23, the executing unit 24 executes the following process. In other words, the executing unit 24 extracts a VSI ID included in the DE-ASSOC message. Then, the executing unit 24 specifies a port profile corresponding to the extracted VSI ID with reference to the VSI table 16. Then, when a notice representing reception of the DE-ASSOC-CONF message the upper-level switch is acquired from the receiving unit 22, the executing unit 24 deletes the specified port profile. In other words, after the DE-ASSOC-CONF message is received from an upper-level switch, the executing unit 24 deletes the specified port profile.

When the determining unit 23 determines that migration of a VM involves the switch 1, the transfer unit 25 transfers a message received by the receiving unit 22 to an upper-level switch determined by the determining unit 23. Further, the transfer unit 25 transfers each response message which the receiving unit 22 has received from the switch 4 or the switch 5 of the upper level.

For example, the transfer unit 25 acquires the PRE-ASSOC message, the ASSOC message, or the DE-ASSOC message in which the determining unit 23 has determined that migration of a VM involves the switch 1. Further, the transfer unit 25 acquires a notice representing that a received message is transferred to a switch determined by the determining unit 23. In this case, the transfer unit 25 transfers each acquired message to the switch determined by the determining unit 23.

Further, when the PRE-ASSOC-CONF message is received by the receiving unit 22, the transfer unit 25 transfers the PRE-ASSOC-CONF message to a server that has transmitted the PRE-ASSOC message. Similarly, when the ASSOC-CONF message is received by the receiving unit 22, the transfer unit 25 transfers the ASSOC-CONF message to a server that has transmitted the ASSOC message. Further, when the DE-ASSOC-CONF message is received by the receiving unit 22, the transfer unit 25 transfers the DE-ASSOC-CONF message to a server that has transmitted the DE-ASSOC message.

Further, the receiving unit 22 stores a request message such as the PRE-ASSOC message and a transmission source acquired from the request message in memory or the like in association with each other. Through this operation, for example, the executing unit 24 or the transfer unit 25 can specify a transmission source of a response message, that is, a transmission destination of a request message. For example, when the PRE-ASSOC-CONF message is received as the response message, the transfer unit 25 may specifies a transmission source corresponding to the PRE-ASSOC message with reference to memory or the like, and then transmit the PRE-ASSOC-CONF message to the specified transmission source. Thereafter, the transfer unit 25 may delete the transmission source corresponding to the PRE-ASSOC message from memory or the like.

Further, the receiving unit 22 stores a request message such as the PRE-ASSOC message, a transmission source, and a VSI ID acquired from the request message in memory or the like in association with one another. Through this operation, even when a plurality of VMs are migrated at the same time, migration of a VM can be specified using a VSI ID, and thus a response message can be transmitted to a transmission source.

Referring back to FIG. 5, the learning unit 26 learns a MAC address of a server or the like. For example, when a path change message broadcasted by an upper-level switch is received through the communication control I/F unit 19, the learning unit 26 updates the MAC table 18 based on a path ID representing the received signal. Further, when a path ID is acquired from the determining unit 23, the learning unit 26 transmits the path change message based on the acquired path ID and a notice representing broadcasting of the signal to the communication control I/F unit 19.

Here, an example of a process of revising the MAC table 18 through the learning unit 26 will be described with reference to FIGS. 11A to 11E. FIG. 11A is a first diagram for describing an example of a process of rewriting a MAC table. FIG. 11B is a second diagram for describing an example of a process of rewriting a MAC table. FIG. 11C is a third diagram for describing an example of a process of rewriting a MAC table. FIG. 11D is a fourth diagram for describing an example of a process of rewriting a MAC table. FIG. 11E is a fifth diagram for describing an example of a process of rewriting a MAC table.

FIGS. 11A to 11E illustrate examples of updating MAC tables based on a path change message to instruct the switches 1 to 5, which include the MAC tables illustrated in FIGS. 9A to 9E, respectively, to update relay destinations related to "MAC3" and "MAC4" based on the path ID "2." Further, in the examples illustrated in FIGS. 11A to 11E, it is assumed that the switch 4 broadcasts the path change message. FIG. 11A illustrates an example of a rewritten MAC table included in the switch 1, and FIG. 11B illustrates an example of a rewritten MAC table included in the switch 2.

FIG. 11C illustrates an example of a rewritten MAC table included in the switch 3. FIG. 11D illustrates an example of a rewritten MAC table included in the switch 4. FIG. 11E illustrates an example of a rewritten MAC table included in the switch 5.

For example, since the communication path represented by the path ID "2" involves the switch 1, the switch 4, and the switch 2, the learning unit 26 of the switch 1 updates a relay destination associated with "MAC4" to "switch 4" as illustrated in (E) in FIG. 11A. Similarly, the learning unit of the switch 2 updates a relay destination associated with "MAC3" to "switch 4" and revises a relay destination associated with "MAC4" to "server 13" as illustrated in (F) in FIG. 11B.

Further, the learning unit of the switch 3 deletes relay destinations associated with "MAC3" and "MAC4" as illustrated in (G) in FIG. 11C. Further, the learning unit of the switch 4 updates a relay destination associated with "MAC3" to "switch 1" and updates a relay destination associated with "MAC4" to "switch 2" as illustrated in (H) in FIG. 11D. Further, the switch 5 does not update the MAC table since the path change message broadcasted by the switch 4 has not arrived at the switch 5.

Referring back to FIG. 5, the switching control unit 27 executes switching control of data received through the communication control I/F unit 19. For example, the switching control unit 27 determines whether or not a destination MAC address of received data remains stored in the MAC table 18. Then, when the MAC address remains stored in the MAC table 18, the switching control unit 27 transmits the received data through a port having a port number associated with the corresponding MAC address. However, when the MAC address does not remain stored in the MAC table 18, the switching control unit 27 executes a flooding operation of transmitting corresponding data through all ports.

Figure 12:
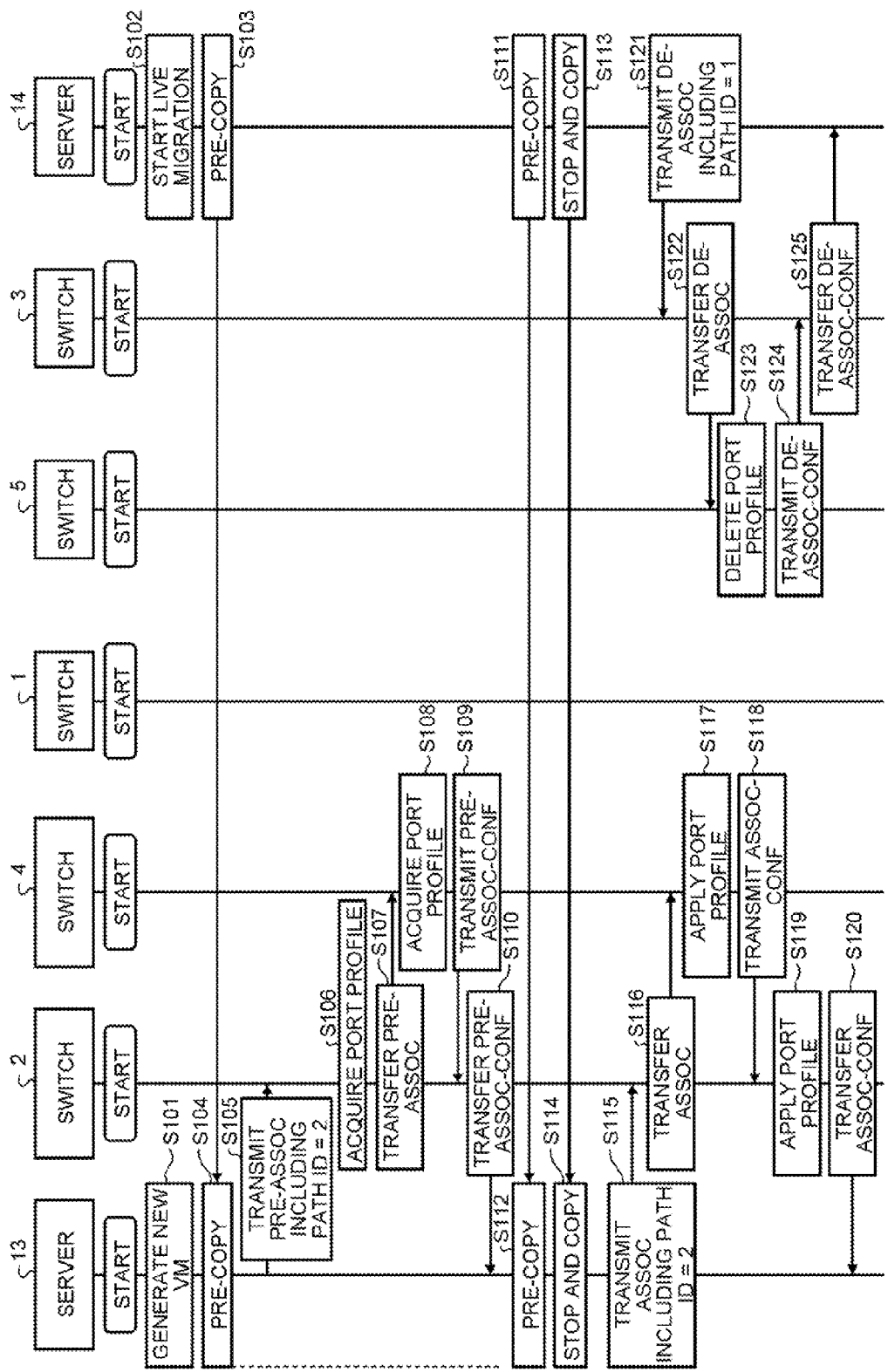
FIG. 12 is a diagram for describing an example of the flow of a process of moving a VM involving a switch.

Next, the flow of a process executed by a system according to the first embodiment will be described with reference to FIG. 12. FIG. 12 is a diagram for describing an example of the flow of a process of moving a VM involving a switch. In the example illustrated in FIG. 12, it is assumed that the management server 10 calculates a communication path represented by the path ID "2" as a new communication path between the VM #4 and the VM #2 after migration.

In the example illustrated in FIG. 12, a sequence in which the VM #4 is moved from the server 14 to the server 13, the flow of a process in each of switches 1 to 5 when a message is received, and the flow of a message process in each of switches 1 to 5 will be described. Further, in the example illustrated in FIG. 12, the switch 2 and the switch 4 to which a new port profile is applied are set as destination switches, and the switch 3 and the switch 5 from which a port profile is deleted are set as source switches. In other words the server 13 is the destination server. And the server 14 is the source server.

In the example illustrated in FIG. 12, the destination server 13 first generates a new VM on its own server (step S101). Subsequently, the server 14 receives a live migration instruction from the management server 10 (step S102), and then executes the pre-copy process in a state in which a migration target VM is being operated by its own server (steps S103 and S104).

When the pre-copy process starts, the server 13 transmits the PRE-ASSOC message including the path ID "2" to the switch 2 (step S105). In this case, the switch 2 acquires a port profile (step S106), and transfers the PRE-ASSOC message to the switch 4 of the upper level which is at a level higher than itself in the communication path represented by the path ID "2" (step S107). Next, when the PRE-ASSOC message is received, the switch 4 acquires a port profile (step S108), and then transmits the PRE-ASSOC-CONF message to the switch 2 (step S109).

In this case, the switch 2 transfers the PRE-ASSOC-CONF message to the server 13 (step S110). Thereafter, the server 13 and the server 14 continue the pre-copy process (steps S111 and S112). Then, when a change amount of memory is a predetermined value or less, the server 13 and the server 14 execute the stop and copy process (steps S113 and S114).

When the stop and copy process starts, the server 13 transmits the ASSOC message including the path ID "2" to the switch 2 (step S115). In this case, the switch 2 transfers the ASSOC message to the switch 4 of the upper level in the communication path represented by the path ID "2" (step S116). Further, upon receiving the ASSOC message, the switch 4 applies the port profile acquired in step S108 (step S117), and transmits the ASSOC-CONF message to the switch 2 (step S118).

When the ASSOC-CONF message is received from the switch 4, the switch 2 applies the port profile acquired in step S106 (step S119). Thereafter, the switch 2 transfers the ASSOC-CONF message to the server 13 (step S120).

Further, after the stop and copy process is executed, the server 14 transmits the DE-ASSOC message including the path ID "1" to the switch 3 (step S121). In this case, the switch 3 transfers the DE-ASSOC message to the switch 5 of the upper level which is at a level higher than itself in the communication path represented by the path ID "1" (step S122).

Then, the switch 5 deletes the port profile related to the VM #4 (step S123), and then transmits the DE-ASSOC-CONF message to the switch 3 (step S124). Then, when the DE-ASSOC-CONF message is received, the switch 3 deletes the port profile related to the VM #4, and then transfers the DE-ASSOC-CONF message to the server 14 (step S125).

Figure 13:
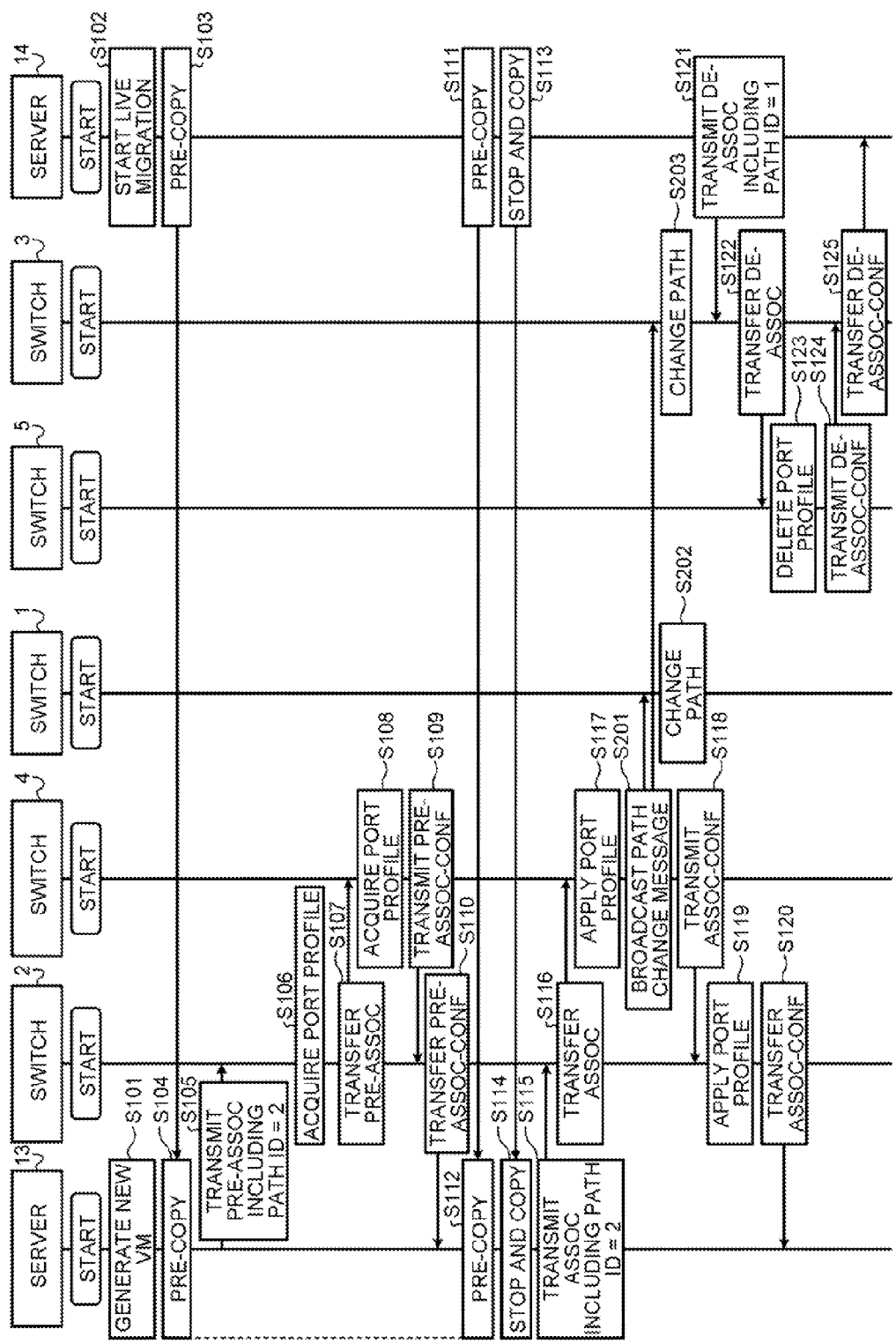
FIG. 13 is a diagram for describing an example of the flow of a process of revising a MAC table.

Next, the flow of a process of revising a MAC table through each of the switches 1 to 5 will be described with reference to FIG. 13. FIG. 13 is a diagram for describing an example of the flow of a process of revising a MAC table. In FIG. 13, the flow of a process of revising a MAC table through each of the switches 1 to 5 is added to the process illustrated in FIG. 12. Further, steps S101 to S125 illustrated in FIG. 13 are the same processes as steps S101 to S125 illustrated in FIG. 12, and the redundant description will not be repeated.

For example, in the example illustrated in FIG. 13, the switch 4 receives the ASSOC message and applies the port profile (step S117), and thereafter executes the following process. In other words, the switch 4 broadcasts a path change message including the path ID "2" to lower-level switches (step S201).

Then, the switch 1 which is the lower-level switch of the switch 4 receives the path change message, and changes the MAC table 18 according to the received path change message (step S202). Further, the switch 3 which is the lower-level switch of the switch 4 receives the path change message, and changes its MAC table according to the received path change message (step S203).

As described above, when each of the switches 1 to 5 does not store a VSI ID included in each received message, each of the switches 1 to 5 acquires a path ID included in each message, and transfers each received message to an upper-level switch which is at a level higher than itself in a communication path represented by the acquired path ID. Then, when a response to the message is received from the upper-level switch, each of the switches 1 to 5 transfers each received response to a server which is a transmission source of each message.

Figure 14:
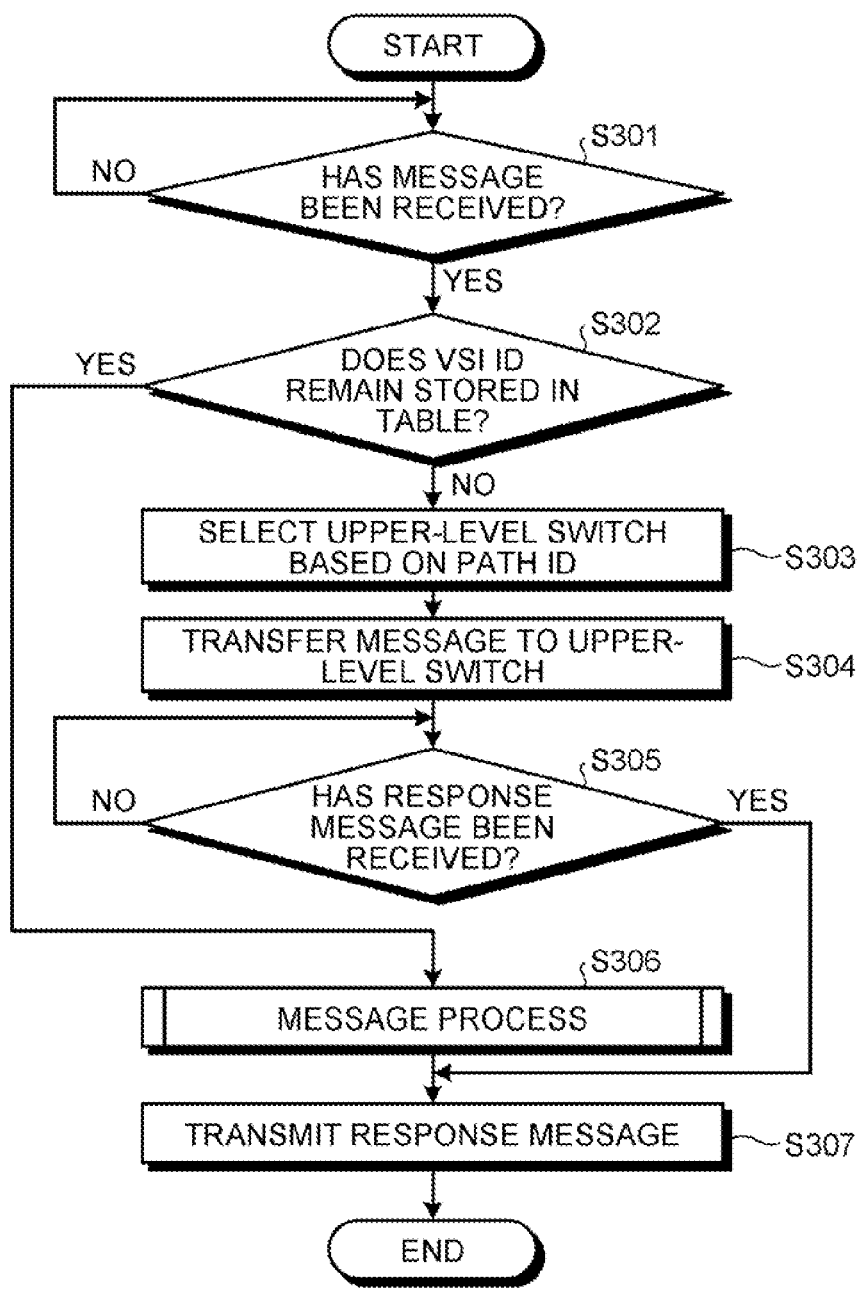
FIG. 14 is a diagram for describing an example of the flow of a process executed by a switch.

Next, an example of the flow of a process executed by each of the switches 1 to 5 will be described with reference to FIG. 14. FIG. 14 is a diagram for describing an example of the flow of a process executed by a switch. For example, in the example illustrated in FIG. 14, the switch 1 determines whether or not any one of the PRE-ASSOC message, the ASSOC message, and the DE-ASSOC message has been received (step S301). Then, when any of the message has not been received (No in step S301), the switch 1 is on standby for reception of each message.

Further, when any of the messages has been received (Yes in step S301), the switch 1 determines whether or not a VSI ID included in the received message remains stored in the VSI table 16 (step S302). Then, when it is determined that the VSI ID does not remain stored in the VSI table 16 (No in step S302), the switch 1 selects an upper-level switch based on the path ID included in each message (step S303).

Further, the switch 1 transfers each message to the selected upper-level switch (step S304). Thereafter, the switch 1 determines whether or not a response message has been received from the upper-level switch (step S305). When it is determined that the response message has not been received from the upper-level switch (No in step S305), the switch 1 is on standby until reception. Further, when it is determined that the response message has been received from the upper-level switch (Yes in step S305), the switch 1 transmits the response message to the transmission source of the message (step S307), and then ends the process.

Further, when it is determined that the VSI ID included in each message remains stored in the VSI table 16 (Yes in step S302), the switch 1 executes a process corresponding the message (step S306). Then, the switch 1 transmits a response message to a transmission source of the message (step S307), and then ends the process.

Figure 15A:
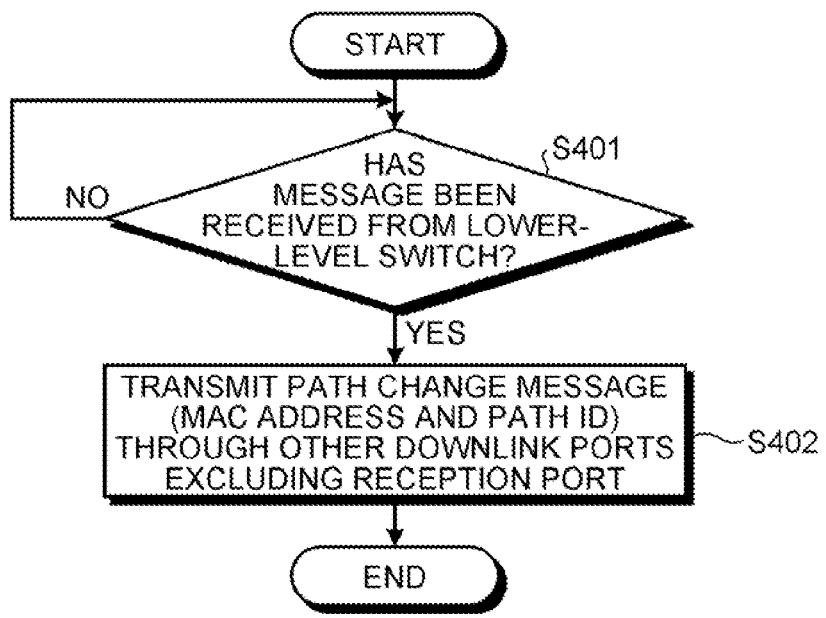
FIG. 15A is a diagram for describing an example of the flow of a process of transmitting a path change message by an upper-level switch.

Next, the flow of a process of updating a MAC table by each of the switches 1 to 5 will be described with reference to FIGS. 15A and 15B. FIG. 15A is a diagram for describing an example of the flow of a process of transmitting a path change message by an upper-level switch. Further, FIG. 15B is a diagram for describing an example of the flow of a process of transmitting a path change message by a lower-level switch.

For example, in the example illustrated in FIG. 15A, the upper-level switch such as the switch 4 or the switch 5 determines whether or not each message has been received from the lower-level switch such as the switches 1 to 3 (step S401). Then, when each message has not been received from the lower-level switch (No in step S401), the upper-level switch is on standby until reception. However, when each message has been received from the lower-level switch (Yes in step S401), the upper-level switch executes the following process.

In other words, the upper-level switch broadcasts a path change message including a MAC address and a path ID through other downlink ports excluding a port through which each message has been received, that is, through ports connected to the lower-level switch (step S402). Thereafter, the upper-level switch ends the process.

Figure 15B:
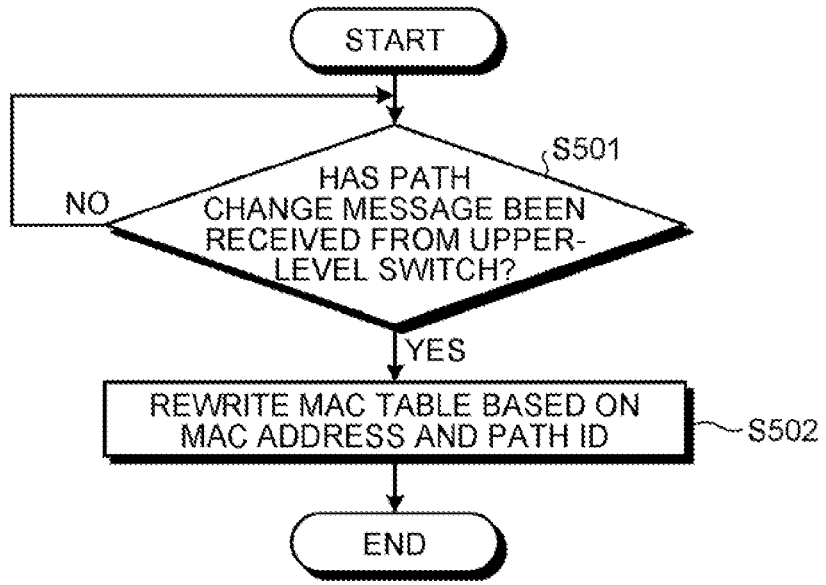
FIG. 15B is a diagram for describing an example of the flow of a process executed when a lower-level switch receives a path change message.

Further, in the example illustrated in FIG. 15B, the lower-level switch such as the switches 1 to 3 determines whether or not a path change message has been received from an upper-level switch such as the switch 4 or the switch 5 (step S501). Then, when the path change message has not been received from the upper-level switch (No in step S501), the lower-level switch is on standby until the path change message is received. When the path change message has been received (Yes in step S501), the lower-level switch executes the following process. In other words, the lower-level switch rewrites the MAC table based on the MAC address and the path ID included in the received path change message (step S502), and then ends the process.

Figure 16:
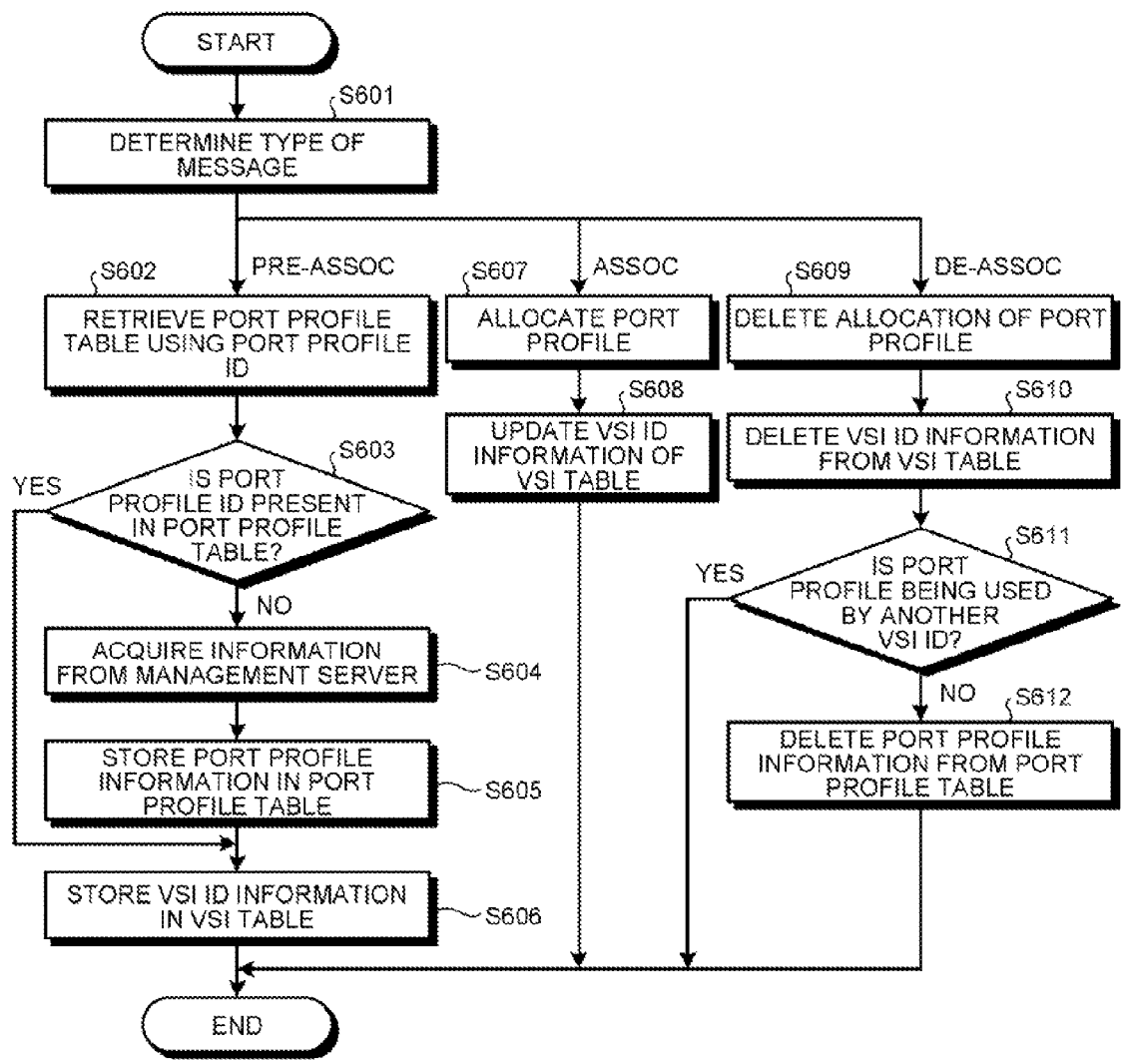
FIG. 16 is a diagram for describing an example of the flow of a process of revising a port profile table.

Next, an example of the process of step S306 illustrated in FIG. 14 will be described with reference to FIG. 16. FIG. 16 is a diagram for describing an example of the flow of a process of revising a port profile table.

As illustrated in FIG. 16, when migration of a VM does not involve a switch, the switch 1 determines the type of message from a received message (step S601). Then, when the type of message is the PRE-ASSOC message, the executing unit 24 retrieves the port profile table 17 using a port profile ID included in the message (step S602).

Subsequently, when the port profile ID is not present in the port profile table 17 (No in step S603), the switch 1 acquires a port profile corresponding to the corresponding port profile ID from the management server 10 (step S604). Then, the switch 1 stores the acquired port profile in the port profile table 17 (step S605).

Thereafter, the switch 1 stores an ID of the acquired port profile and VSI information in the VSI table 16 (step S606). At this time, the switch 1 stores "FETCHED" as "VSI State" of the VSI information. Further, the switch 1 stores a port number of as a port through which a request message has been received and a VSI ID of a received message as the VSI information.

Meanwhile, when the port profile ID is present in the port profile table 17 (Yes in step S603), the switch 1 executes step S606 without executing steps S604 and S605.

Further, when it is determined in step S601 that the type of message is the ASSOC message, the switch 1 executes allocation of a port profile (step S607). For example, the switch 1 sets a VLAN or a band to a port. Then, the switch 1 retrieves the VSI table 16 using a VSI ID included in the received message, and updates "VSI State" associated with the VSI ID to "ACTIVE" (step S608).

Further, when it is determined in step S601 that the type of message is the DE-ASSOC message, the switch 1 deletes allocation of a port profile (step S609). For example, the switch 1 deletes setting of a VLAN or a band to a port. Then, the switch 1 retrieves the VSI table 16 using a VSI ID included in the received message, and deletes information associated with the VSI ID (step S610).

Subsequently, the switch 1 acquires the port profile ID from the message, and then determines whether or not the port profile ID is being used by another VSI ID (step S611). Then, when the port profile ID is not being used by another VSI ID (No in step S611), the switch deletes information stored in the port profile table 17 in association with the corresponding port profile ID (step S612). However, when the port profile ID is being used by another VSI ID (Yes in step S611), the switch 1 ends the process.

Effects of First Embodiment

As described above, when the VSI discovery protocol is extended and migration of a VM involves the switch 1, the switch 1 transfers each message to an upper-level switch which is at a level higher than itself in a communication path through which communication of a VM of a migration target is relayed. Thus, even when the switches 1 to 5 are configured at multiple levels and connected by a multipath, the switch 1 can automatically set a port profile of each of the switches 1 to 5.

Further, the switch 1 determines an upper-level switch which is at a level higher than itself in a communication path represented by a path ID using the path ID included in each message, and transfers each message to a determined switch. Thus, the switch 1 can cause a switch that requests an update of a port profile to automatically set a port profile.

Further, when migration of a VM does not involve the switch 1, the switch 1 updates a port profile without transferring each message. Thus, when the other switches 2 to 5 do not update a port profile, the switch 1 does not transfer a message, so that a band of a network can be made available.

Further, when there is no upper-level switch which is at a level higher than itself in a communication path represented by a path ID included in a received message, the switch 1 updates port profile information without transferring each message. Thus, when the other switches 2 to 5 do not update a port profile, the switch 1 does not transfer a message, so that a band of a network can be made available.

Further, the switch 1 transfers each message to an upper-level switch, and when a response to each message is received from the upper-level switch, the switch 1 transfers the received response to a server which is a transmission source of each message. Thus, since the switch 1 appropriately transmits a response to a server which is a transmission source of each message, it is desirable to apply a process using the VSI discovery protocol without applying a complicated protocol to each server.

Further, the switch 1 receives the ASSOC-CONF message or the DE-ASSOC-CONF message from the upper-level switch, and then executes setting or deletion of a port profile. Thus, the switch 1 can execute setting or deletion of a port profile at an appropriate timing.

[b] Second Embodiment

In the following second embodiment, an information processing system will be described that adopts a fabric technique in which a plurality of switches are connected to each other.

Conventionally, a fabric technique has been known in which a collective entity in which a plurality of switches are connected with each other is seen as a single switch from a point of view of an external network. An information processing network to which the fabric technique is applied is seen from sometimes relays data in an end host mode (EHM) in which operation is performed as if a server is connected to an end point to which an external network is connected when seen from the end point.

For example, an information processing network includes a plurality of servers which each operates a VM and a fabric in which a plurality of switches are connected to each other, and communication between VMs operated by the servers is relayed by the switches of the fabric. Further, VMs are divided into groups called pin groups, and VMs of each pin group are pin-connected to the same uplink and connected to an external network through the pin-connected uplink. In other words, VMs belonging to the same pin group are connected to an external network through the same end point.

Here, a switch included in a fabric transfers data, which is transmitted or received by a single VM, over multiple paths in some cases. For example, when data transmitted by a VM is received, a switch selects a path to transfer data based on a transmission destination IP address of data, a port number, or the like, and then transfers data through the selected path.

Figure 17:
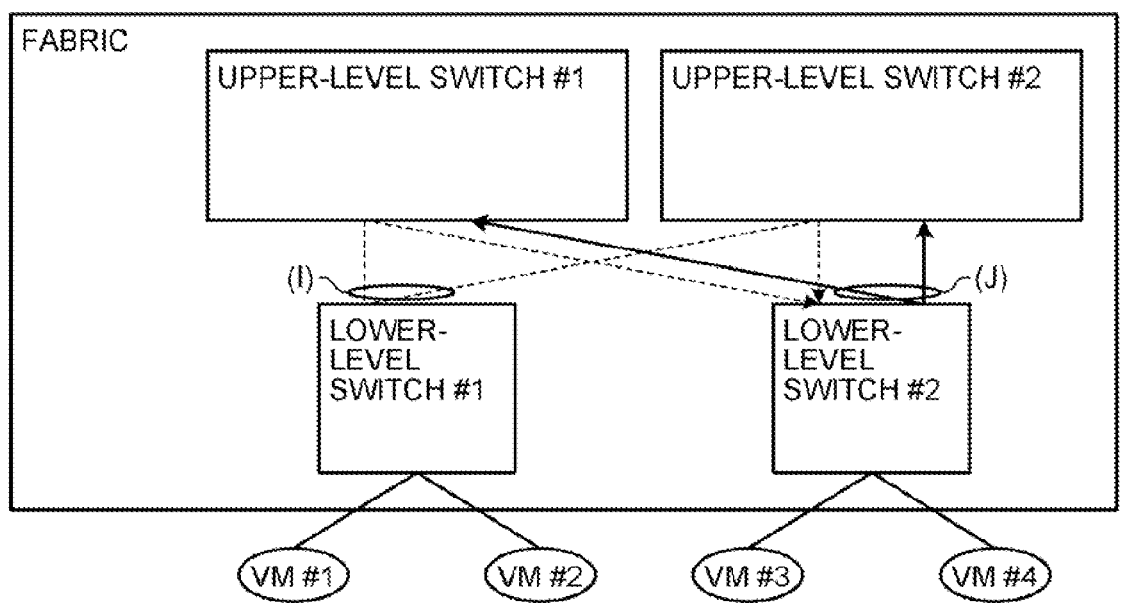
FIG. 17 is a diagram for describing an example of communication by a switch of a fabric.

Next, a process in which a switch included in a fabric transfers data through a multipath will be described with reference to FIG. 17. FIG. 17 is a diagram for describing an example of communication by a switch of a fabric. In the example illustrated in FIG. 17, a fabric includes an upper-level switch #1, an upper-level switch #2, a lower-level switch #1, and a lower-level switch #2. Further, the upper-level switch #1 and the upper-level switch #2 are switches serving as an end point of the fabric, and the lower-level switch #1 and the lower-level switch #2 are switches connected with VMs #1 to #4.

For example, the lower-level switch #1 receives data which is transmitted from the VM #1 to the VM #3. Then, the lower-level switch #1 selects a path in which data is transferred to the lower-level switch #2 through the upper-level switch #1 or a path in which data is transferred to the lower-level switch #2 through the upper-level switch #2 based on an IP address or a port number which is a destination of data as indicated by (I) in FIG. 17. Then, the lower-level switch #1 transfers data through the selected path.

Here, since the related VSI discovery protocol is a protocol for automatically setting a port profile to a switch connected with a server, there is a problem in that it is difficult to automatically set a port profile to each switch of a fabric in which a plurality of switches are connected with each other.

Further, there may be considered a technique in which a switch that has received a message (hereinafter, referred to as a "VDP message") of the VSI discovery protocol (VDP) broadcasts a message to an upper-level switch. However, when the switch broadcasts the message to the upper-level switch, the message is transmitted even to a switch not connected with a pin group of a VM to move, and thus traffic occurs.

For example, in the example illustrated in FIG. 17, it is assumed that the VM #1 and the VM #2 are connected to the upper-level switch #1 through a pin connection, and the VM #3 and the VM #4 are connected to the upper-level switch #2 through a pin connection. In this case, port profiles of the VM #1 and the VM #2 are present in the upper-level switch #1, but the port profiles of the VM #1 and the VM #2 are not present in the upper-level switch #2.

Here, when the VM #1 controlled by the lower-level switch #2 is moved, the lower-level switch #2 broadcasts the message of the VSI discovery protocol to the upper-level switch #1 and the upper-level switch #2 as indicated by (J) in FIG. 17. However, since the upper-level switch #2 does not include the port profile of the VM #1, the lower-level switch #2 causes traffic.

According to an aspect of a technique disclosed in the second embodiment, it is possible to automatically change a port profile between switches to which the fabric technique is applied.

Figure 18:
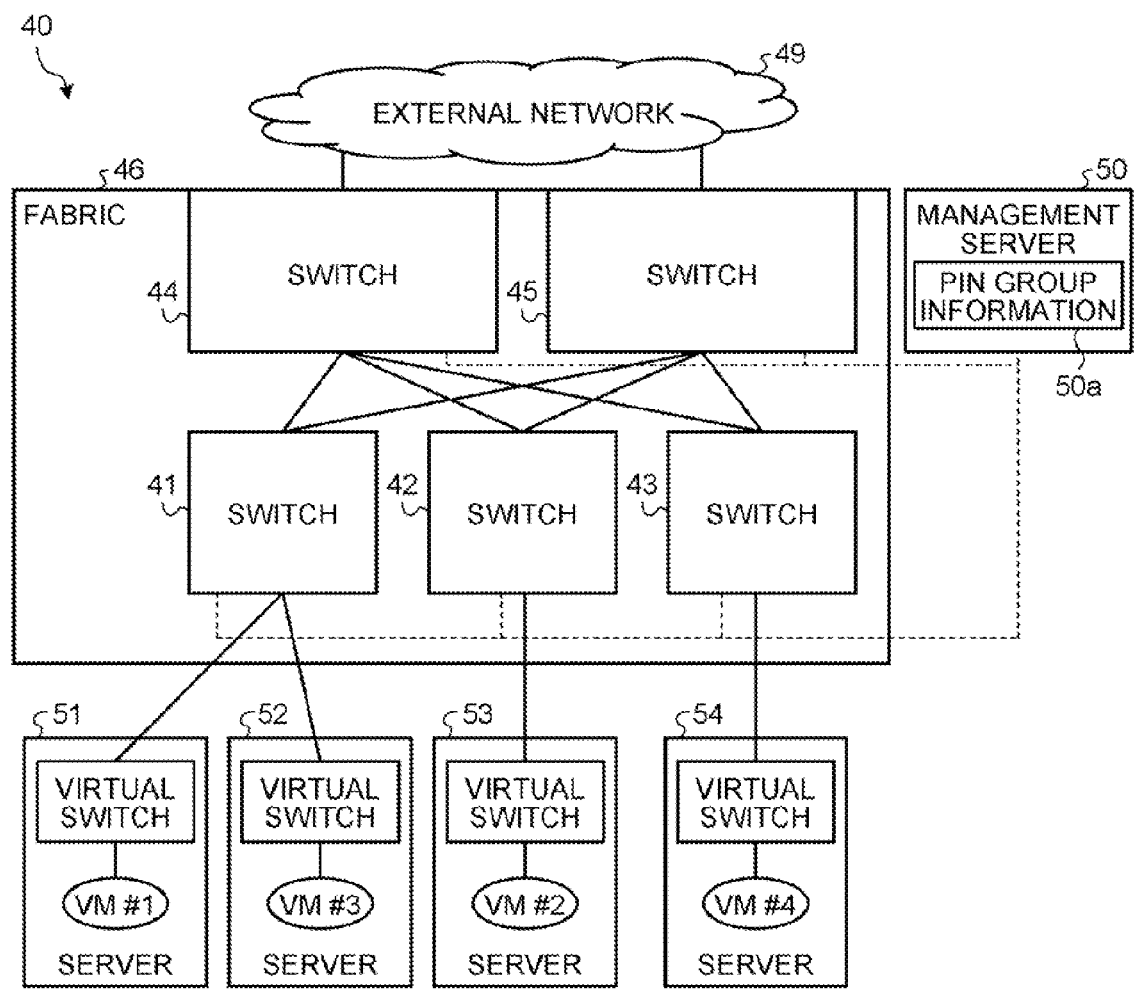
FIG. 18 is a diagram for describing an example of an information processing system according to a second embodiment.

Next, an information processing system according to the second embodiment will be described with reference to FIG. 18. FIG. 18 is a diagram for describing an example of the information processing system according to the second embodiment. In the example illustrated in FIG. 18, an information processing system 40 includes a fabric 46 in which a plurality of switches 41 to 45 are connected with one another, a management server 50, and a plurality of servers 51 to 54. Further, each of the servers 51 to 54 is connected with an external network 49 through the fabric 46.

Further, the VM #1 and the VM #2 belong to a pin group connected to the external network 49 through the switch 44 serving as an end point. The VM #3 and the VM #4 belong to a pin group connected to the external network 49 through the switch 45 serving as an end point. In the following, the pin group of the VM #1 and the VM #2 is referred to as a pin group A, and the pin group of the VM #3 and the VM #4 is referred to as a pin group B.

Next, the servers 51 to 54, the management server 50, and the fabric 46 which are included in the information processing system 40 will be described. The servers 51 to 54 perform the same functions as the servers 11 to 14, respectively. In other words, each of the servers 51 to 54 is an information processing apparatus that executes a VMM called a hypervisor or the like and operates a VM.

In the example illustrated in FIG. 18, the server 51 operates the VM #1, the server 52 operates the VM #3, the server 53 operates the VM #2, and the server 54 operates the VM #4. Further, each of the servers 51 to 54 operates a virtual switch and relays communication among the VMs #1 to #4.

Further, when the VM (#1 to #4) is moved between servers according to an instruction of the management server 50, the server 51 to 54 transmits a VDP message to a switch connected with itself according to the VSI discovery protocol. Specifically, when the server 51 to 54 serves as a destination server, the server 51 to 54 performs the pre-copy process of receiving data of a VM of a migration target, and then transmits the PRE-ASSOC message.

Further, the server 51 to 54 executes the stop and copy process when the pre-copy process ends. Then, upon receiving the PRE-ASSOC-CONF message which is a response to the PRE-ASSOC message, the server 51 to 54 transmits the ASSOC message for instructing setting application of port profile information.

Further, when the server 51 to 54 serves as a source server, the server 51 to 54 starts the pre-copy process, then stops a VM of a migration target, and executes the stop and copy process of transmitting all data related to the VM. Thereafter, the server 51 to 54 transmits the DE-ASSOC message to instruct deletion of a port profile related to a VM of a migration target.

Unlike the first embodiment, each of the servers 51 to 54 does not include a path ID in a message such as the PRE-ASSOC message, the ASSOC message, and the DE-ASSOC message, and then transmits the messages. In other words, each of the servers 51 to 54 transmits a message including a VSI ID representing a VM of a migration target, similarly to the related VSI discovery protocol.

Next, the management server 50 will be described. The management server 50 instructs each of the servers 51 to 54 to perform an activation process or a stop process of each of VMs #1 to #4 through a management network. Further, the management server 50 stores port profile information applied to each of the switches 41 to 45 and pin group information 50a to which each of the VMs #1 to #4 operated by each of the servers 51 to 54 belongs. Further, the management server 50 stores an operation environment of a VM in association with a VM operated by each of the servers 51 to 54. Further, the management server 50 stores information such as VLAN, QoS, or allocated band, which corresponds to a VM.

Further, the management server 50 calculates a server that efficiently operates each of the VMs #1 to #4 based on a usage rate of a CPU in each of the servers 51 to 54, a traffic volume in a communication path, power consumption of each of the servers 51 to 54, and the like. Further, when any one VM is moved to another server, the management server 50 instructs a source sever and a destination server to execute a VM migration process according to migration of the VM.

Here, the management server 50 selects an uplink through which a VM included in a pin group of a VM of a migration target newly performs communication with the external network 49. Further, the management server 50 sets an uplink to which a VM included in a pin group of a VM of a migration target is pin-connected as an uplink before change, and sets a newly selected uplink as an uplink after change, and notifies each of the switches 41 to 45 of the uplinks.

The management server 50 may select a new uplink using an arbitrary technique. Further, even when there is no migration of a VM, in order to change an uplink to which a VM of a pin group is pin-connected, the management server 50 performs the above-described process, and then notifies each of the switches 41 to 45 of an entry of pin group information in which the uplink before change is associated with the uplink after change.

Here, FIG. 19 is a diagram for describing an example of pin group information according to the second embodiment. In the example illustrated in FIG. 19, the pin group information 50*a* includes a plurality of entries in which a pin group, an uplink before change, an uplink after change, a VM, and remarks are associated with one another. Here, the pin group refers to an identifier of each pin group, and the uplink before change refers to an uplink before change to which a VM belonging to a pin group of the same entry is pin-connected.

Further, the uplink after change refers to an uplink after change to which a VM belonging to a pin group of the same entry is newly connected. Further, the VM refers to a VM belonging to a pin group of the same entry.

Further, various control information such as information of a client or a tenant that uses a VM belonging to a pin group is included in the remarks.

For example, in the example illustrated in FIG. 19, the pin group information 50*a* represents that the VM #1 and the VM #2 of the pin group A are pin-connected to the switch 44 serving as an uplink to perform communication with the external network 49. Further, the pin group information 50*a* represents that the VM #3 and the VM #4 of the pin group B are pin-connected to the switch 45 serving as an uplink to perform communication with the external network 49. Further, the pin group information 50*a* represents that the VM #3 and the VM #4 of the pin group B are pin-connected to the switch 44 serving as a new uplink. Further, for example, the management server 50 transmits an entry of the pin group B to each of the switches 41 to 45.

Next, each of the switches 41 to 45 will be described. The switches 41 to 45 are switches that relay data of each of the VMs #1 to #4 operated by each of the servers 51 to 54, similarly to the switches 1 to 5. Specifically, the switches 41 to 45 are connected to one another to operate as the fabric 46.

Further, the switch 44 and the switch 45 are connected with the external network 49, and operate as an uplink to which each of the VMs #1 to #4 is pin-connected. In detail, the VM #1 and the VM #2 belonging to the pin group A are pin-connected to the switch 44, and the VM #3 and the VM #4 belonging to the pin group B are pin-connected to the switch 45.

Further, when the message of the VSI discovery protocol is received from a lower-level switch or a server 51 to 54 connected with itself, the switch 41 to 45 updates a port profile. Next, a process of updating a port profile by the switches 41 to 45 will be described. In the following description, the switches 42 to 45 perform the same process as the switch 41, and the redundant description will not be repeated.

For example, the switch 41 receives an entry of the pin group information 50*a* from the management server 50, and then stores the received entry. Further, the switch 41 stores port profiles of the VM #1 and the VM #3 operated by the servers 51 and 52 connected to itself, and transfers packets according to the stored port profile. In other words, when a packet is received through a port associated with the VM #1, the switch 41 transfers the packet as a packet received from the VM #1, similarly to the switch 1.

Further, when the VDP message is received from the server 51 or the server 52 adjacent to itself, the switch 41 determines content of the VDP message. In other words, the switch 41 determines which of the PRE-ASSOC message, the ASSOC message, and the DE-ASSOC message corresponds to the received message. In other words, the switch 41 determines whether the VDP message is either of the PRE-ASSOC message or the ASSOC message representing setting of a port profile or the DE-ASSOC message representing deletion of a port profile.

Further, when the received message is the PRE-ASSOC message or the ASSOC message, the switch 41 acquires a VSI ID from the VDP message, and determines whether or not the acquired VSI ID remains stored. In other words, the switch 41 determines whether or not migration of a VM of a migration target involves the switch 41.

Then, when the acquired VSI ID remains stored, the switch 41 acquires new port profile information from the management server 50, and executes port profile setting preparation according to the acquired port profile information, similarly to the switch 1. Then, the switch 41 transmits the PRE-ASSOC-CONF message which is a response to the PRE-ASSOC message to the transmission source server of the PRE-ASSOC message, that is, the destination server.

However, when the acquired VSI ID does not remain stored, the switch 41 reads an entry of pin group information received from the management server 50, and determines a pin group to which a VM represented by the identified VSI ID, that is, a VM of a migration target belongs. Thereafter, the switch 41 identifies an upper-level switch to which the VDP message is transferred according to content of the identified VDP message and an uplink to which a VM of the determined pin group is pin-connected.

In detail, when content of the VDP message is the PRE-ASSOC message or the ASSOC message that requests setting of a new port profile, the switch 41 identifies an uplink to which a pin group to which a VM of a migration target belongs is newly pin-connected. In other words, the switch 41 identifies an uplink after change of a pin group to which a VM of a migration target belongs. Then, the switch 41 selects an upper-level switch to which the VDP message is transferred based on the uplink after change, and then transfers the VDP message to the selected upper-level switch.

Further, when content of the VDP message is the DE-ASSOC message that requests deletion of a port profile, the switch 41 prepares for deletion of a port profile and identifies an uplink to which a pin group to which a VM of a migration target belongs is pin-connected. In other words, the switch 41 identifies an uplink before change of a pin group to which a VM of a migration target belongs. Then, the switch 41 selects an upper-level switch to which the VDP message is transferred based on the uplink before change, and then transfers the VDP message to the selected switch.

Further, when the ASSOC-CONF message is received as a response from the upper-level switch that has transferred the ASSOC message, the switch 41 executes prepared port profile setting, and then transfers the ASSOC-CONF message to the lower-level switch. Further, when the DE-ASSOC-CONF message is received as a response from the upper-level switch that has transferred the DE-ASSOC message, the switch 41 executes prepared port profile deletion, and then transfers the DE-ASSOC-CONF message to the lower-level switch.

Further, when the VDP message is received, if the switch 41 is the highest upper-level switch, that is, if the switch 41 is an uplink to which a VM of a migration target is pin-connected, the switch 41 executes setting or deletion of a port profile without transferring the VDP message. Then, the switch 41 transmits a response to the switch (41 to 43) of the lower level which is a transmission source of the VDP message.

Figure 20:
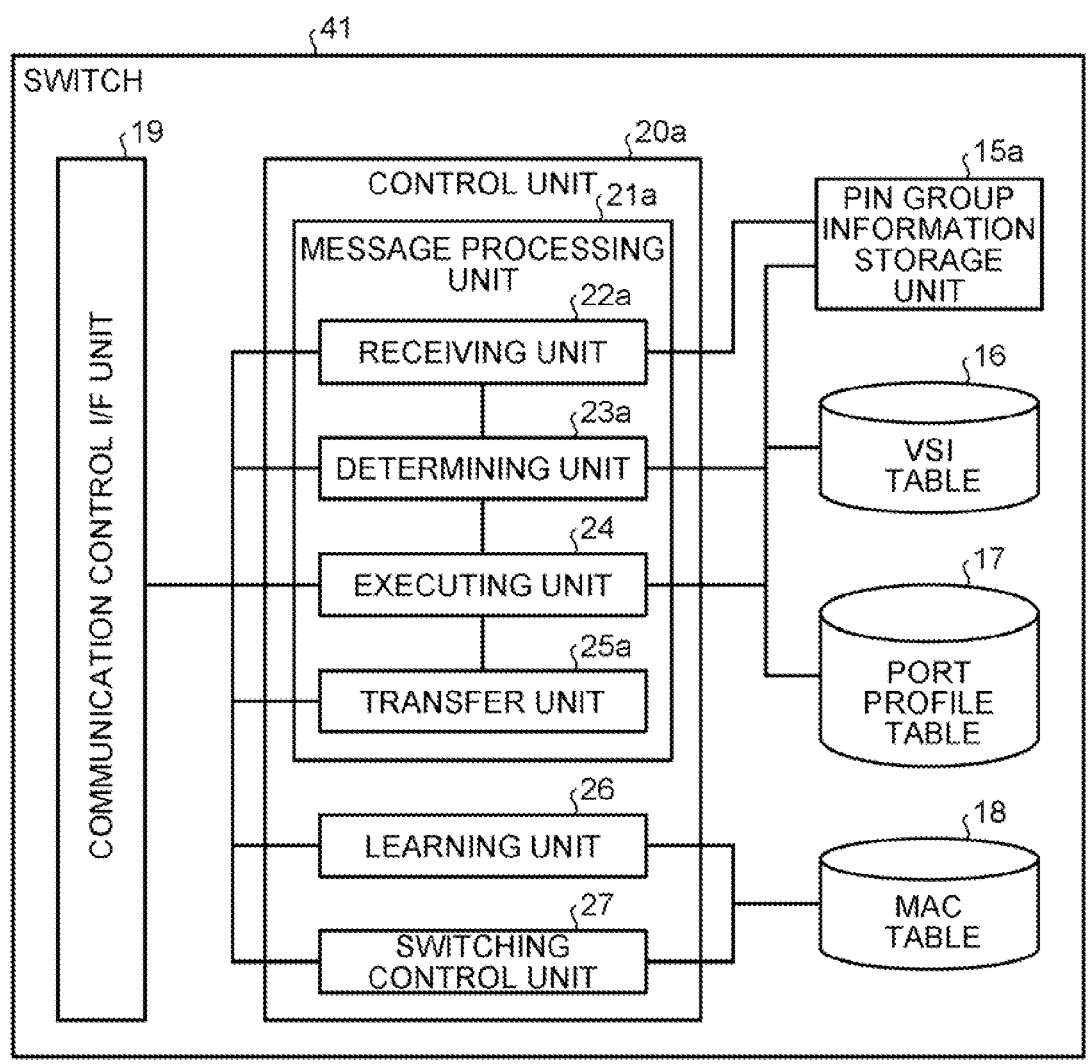
FIG. 20 is a diagram for describing an example of a switch according to the second embodiment.

Next, an example of a functional configuration of the switch 41 will be described with reference to FIG. 20. FIG. 20 is a diagram for describing an example of a switch according to the second embodiment. In the example illustrated in FIG. 20, the switch 41 includes a communication control I/F unit 19, a control unit 20a, a pin group information storage unit 15a, a VSI table 16, a port profile table 17, and a MAC table 18. Further, the control unit 20a includes a message processing unit 21a, a learning unit 26, and a switching control unit 27. Further, the message processing unit 21a includes a receiving unit 22a, a determining unit 23a, an executing unit 24, and a transfer unit 25a. In the following description, components having the same reference numerals as in FIG. 5 execute the same processes as in the first embodiment, and thus the redundant description will not be repeated.

The receiving unit 22a performs the same function as the receiving unit 22. For example, the receiving unit 22a receives a VDP message which is a setting request of port profile information corresponding to a VM of a migration target from a destination server to which the VM of the migration target is to be moved. Further, the receiving unit 22a receives a VDP message which is a deletion request of port profile information corresponding to a corresponding VM from a source server operating the corresponding VM. Then, the receiving unit 22a outputs the received VDP message to the determining unit 23a.

Further, when the PRE-ASSOC-CONF message is received from the switch 44 or 45 of the upper level, the receiving unit 22a outputs the received PRE-ASSOC-CONF message to the transfer unit 25a. Further, when the ASSOC-CONF message or the DE-ASSOC-CONF message is received from the switch 44 or the switch 45 of the upper level, the receiving unit 22a outputs the corresponding message to the transfer unit 25a, and outputs the fact that each response has been received to the executing unit 24.

In addition, the receiving unit 22a receives the pin group information 50a of a pin group to which a VM of a migration target belongs from the management server 50, and then stores the received pin group information 50a in the pin group information storage unit 15a.

The determining unit 23a determines whether or not a VSI ID included in the VDP message received from the receiving unit 22a remains stored in the VSI table 16, similarly to the determining unit 23. Then, when the VSI ID remains stored in the VSI table 16, the determining unit 23a determines that migration of a VM does not involve the switch 41, and then outputs a notice representing that migration of a VM does not involve the switch 41 and the VDP message to the executing unit 24.

However, when the VSI ID does not remain stored in the VSI table 16, the determining unit 23a determines that migration of a VM involves the switch 41, and then executes the following process. First, the determining unit 23a determines whether or not the VDP message is any one of the PRE-ASSOC message, the ASSOC message, and the DE-ASSOC message with reference to the TLV type field of the VDP message. Further, the determining unit 23a identifies a VM represented by a VSI ID, and determines a pin group to which the identified VM belongs based on the pin group information stored in the pin group information storage unit 15a.

Then, when the VDP message is the PRE-ASSOC message or the ASSOC message, the determining unit 23a acquires an uplink after change of the determined pin group from the pin group information storage unit 15a. Further, when the VDP message is the DE-ASSOC message, the determining unit 23a acquires an uplink before change of the determined pin group from the pin group information storage unit 15a.

Here, the determining unit 23a determines whether or not the acquired uplink before change or the acquired uplink after change is the switch 41. Then, when the acquired uplink before change or the acquired uplink after change is not the switch 41, the determining unit 23a transmits the VDP message to the executing unit 24. Further, the determining unit 23a transmits the VDP message and either of the uplink before change and the uplink after change to the transfer unit 25a.

However, when the acquired uplink before change or the acquired uplink after change is the switch 41, the determining unit 23a transmits the VDP message to the executing unit 24. The executing unit 24 according to the second embodiment performs the same process as the executing unit 24 according to the first embodiment, and executes setting or deletion of the port profile stored in the port profile table 17.

When the determining unit 23a determines that migration of a VM involves the switch 41, the transfer unit 25a receives either the VDP message and the uplink before change or the VDP message and the uplink after change. In this case, the transfer unit 25a transfers the VDP message to the uplink before change or the uplink after change which has been received.

In other words, when the VDP message is the PRE-ASSOC message or the ASSOC message, the transfer unit 25a transfers the VDP message to the uplink after change. Further, when the VDP message is the DE-ASSOC message, the transfer unit 25a transmits the VDP message to the uplink before change.

Further, when the receiving unit 22a receives a response, the transfer unit 25a transfers the response to a switch or a server which is a transmission source of the VDP message, similarly to the transfer unit 25. Here, the transfer unit 25a transfers the response to a switch or a server which is a transmission source of the VDP message using the same technique as the transfer unit 25.

In other words, the receiving unit 22a stores the VDP message such as the PRE-ASSOC message in memory or the like in association with a transmission source of the VDP message. Then, the transfer unit 25a transmits a response to the VDP message to the transmission source of the VDP message stored in memory or the like. Thereafter, the transfer unit 25a deletes the transmission source of the VDP message whose response has been transmitted from the memory or the like.

Further, when either the uplink after change or the uplink before change is directly connected with the switch 41, the transfer unit 25a transfers the VDP message through the communication control I/F unit 19. However, when either the uplink after change or the uplink before change is not directly connected with the switch 41, the transfer unit 25a acquires a path to transfer the VDP message to the uplink after change or the uplink before change from the management server 50, and then transmits the VDP message through the acquired path.

For example, the transfer unit 25a acquires a path in which a VM of a migration target has been pin-connected to the uplink before change or a path in which a VM of a migration target is to be pin-connected to the uplink after change from the management server 50. Then, the transfer unit 25a transfers the VDP message to an upper-level switch which is at a level higher than itself in the acquired path.

Next, a process executed by each of the switches 41 to 45 of the fabric 46 when a VM is moved will be described with reference to FIGS. 21 and 22. The following described will be made in connection with an example in which the VM #4 operated by the server 54 is moved to the server 53, and operations of the switch 43, the switch 45, and the server 54 are stopped for power save control.

Figure 21:
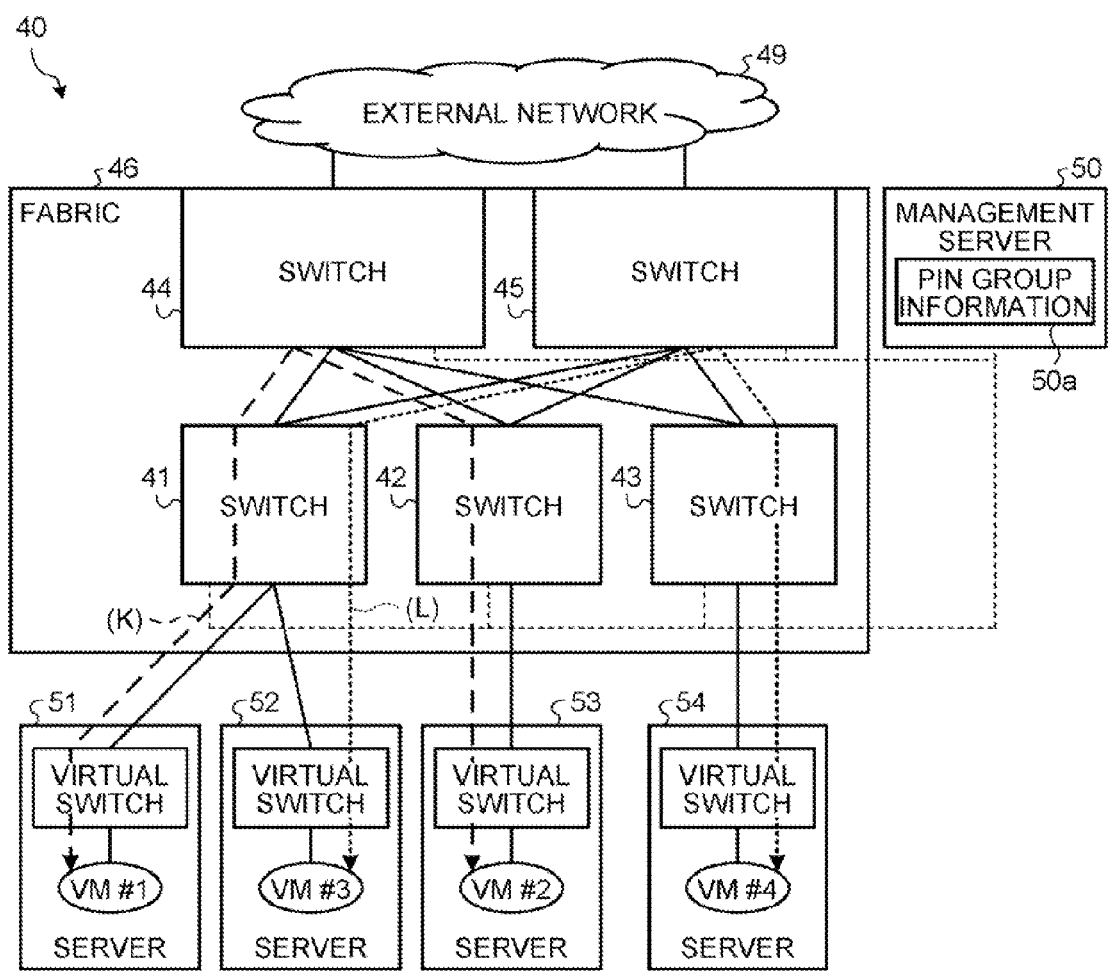
FIG. 21 is a diagram for describing an example in which a switch transfers data with respect to each pin group.

FIG. 21 is a diagram for describing an example in which a switch transfers data with respect to each pin group. For example, as indicated by (K) in FIG. 21, the VM #1 and the VM #2 of the pin group A are pin-connected to the switch 44 serving as an uplink, and perform transmission and reception of data. Further, as indicated by (L) in FIG. 21, the VM #3 and the VM #4 of the pin group B are pin-connected to the switch 45 serving as an uplink, and perform transmission and reception of data.

In detail, the VM #1 and the VM #2 of the pin group A perform transmission and reception of data using the switch 44 as the upper-level switch and the switch 41 and the switch 42 as the lower-level switches. Further, the VM #3 and the VM #4 of the pin group B perform transmission and reception of data using the switch 45 as the upper-level switch and the switch 41 and the switch 43 as the lower-level switches.

Here, the management server 50 selects the switch 44 as an uplink to which the pin group B is connected when moving the VM #4 and stopping the switch 45 and the switch 43. As a result, as illustrated in FIG. 19, the management server 50 stores the switch 44 in an entry of the pin group B of the pin group information 50a as an uplink after change. Then, the management server 50 transmits the entry of the pin group B of the pin group information 50a to each of the switches 41 to 45.

Next, the server 53 transmits the PRE-ASSOC message including the VSI ID of the VM #4 to the switch 42. The switch 42 performs port profile setting preparation related to the VM #4 from the management server. Further, the switch 42 identifies the switch 44 which is the uplink after change of the pin group to which the VM #4 belongs from the entry of the pin group information 50a received from the management server 50. Then, the switch 42 transmits the PRE-ASSOC message to the switch 44.

Thus, the switch 44 acquires a new port profile related to the VM #4 from the management server 50, and then transmits the PRE-ASSOC-CONF message to the switch 42. The switch 42 transmits the PRE-ASSOC-CONF message to the server 53.

Subsequently, the switch 42 receives the ASSOC message from the server 53. The switch 42 executes the same process as in the PRE-ASSOC message, and then transfers the ASSOC message to the switch 44 which is the uplink after change of the pin group B. The switch 44 applies the port profile related to the VM #4, and transmits the ASSOC-CONF message to the switch 42. Further, when the ASSOC-CONF message is received from the switch 44, the switch 42 applies the port profile related to the VM #4, and transfers the ASSOC-CONF message to the server 53.

Further, when the DE-ASSOC message related to the VM #4 is received from the server 54, the switch 43 prepares deletion of the port profile related to the VM #4, and identifies the switch 45 which is the uplink before change of the pin group to which the VM #4 belongs from the entry of the pin group information 50a received from the management server 50. Then, the switch 43 transmits the DE-ASSOC message to the switch 45.

The switch 45 deletes the port profile related to the VM #4, and transmits the DE-ASSOC-CONF message to the switch 43. Further, when the DE-ASSOC-CONF message is received from the switch 45, the switch 43 deletes the port profile related to the VM #4, and transfers the DE-ASSOC-CONF message to the server 54.

Figure 22:
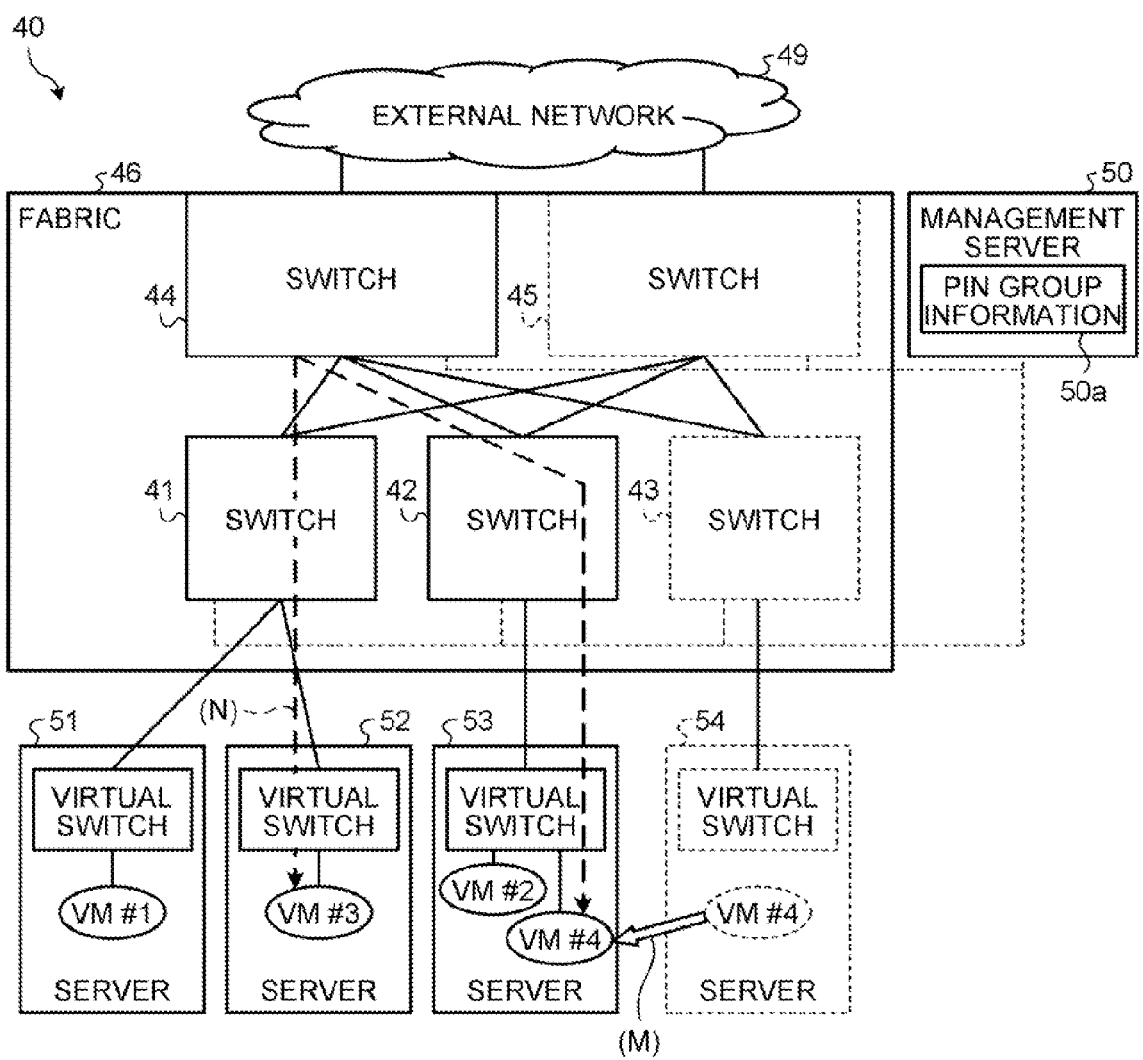
FIG. 22 is a diagram for describing a state after migration of a virtual machine.

FIG. 22 is a diagram for describing a state after migration of a VM. After the above-described process is executed, the information processing system 40 moves the VM #4 to the server 53 as indicated by (M) in FIG. 22. As a result, each of the switches 41 to 45 of the fabric 46 changes a communication path between the VM #3 and the VM #4 belonging to the pin group B as indicated by (N) in FIG. 22.

Specifically, each of the switches 41 to 45 of the fabric 46 relays communication between the VM #3 and the VM #4 belonging to the pin group B through the switch 41, the switch 44, and the switch 42. Further, each of the switches 41 to 45 of the fabric 46 sets the switch 44 as an uplink to which the VM #3 and the VM #4 belonging to the pin group B are pin-connected.

Figure 23:
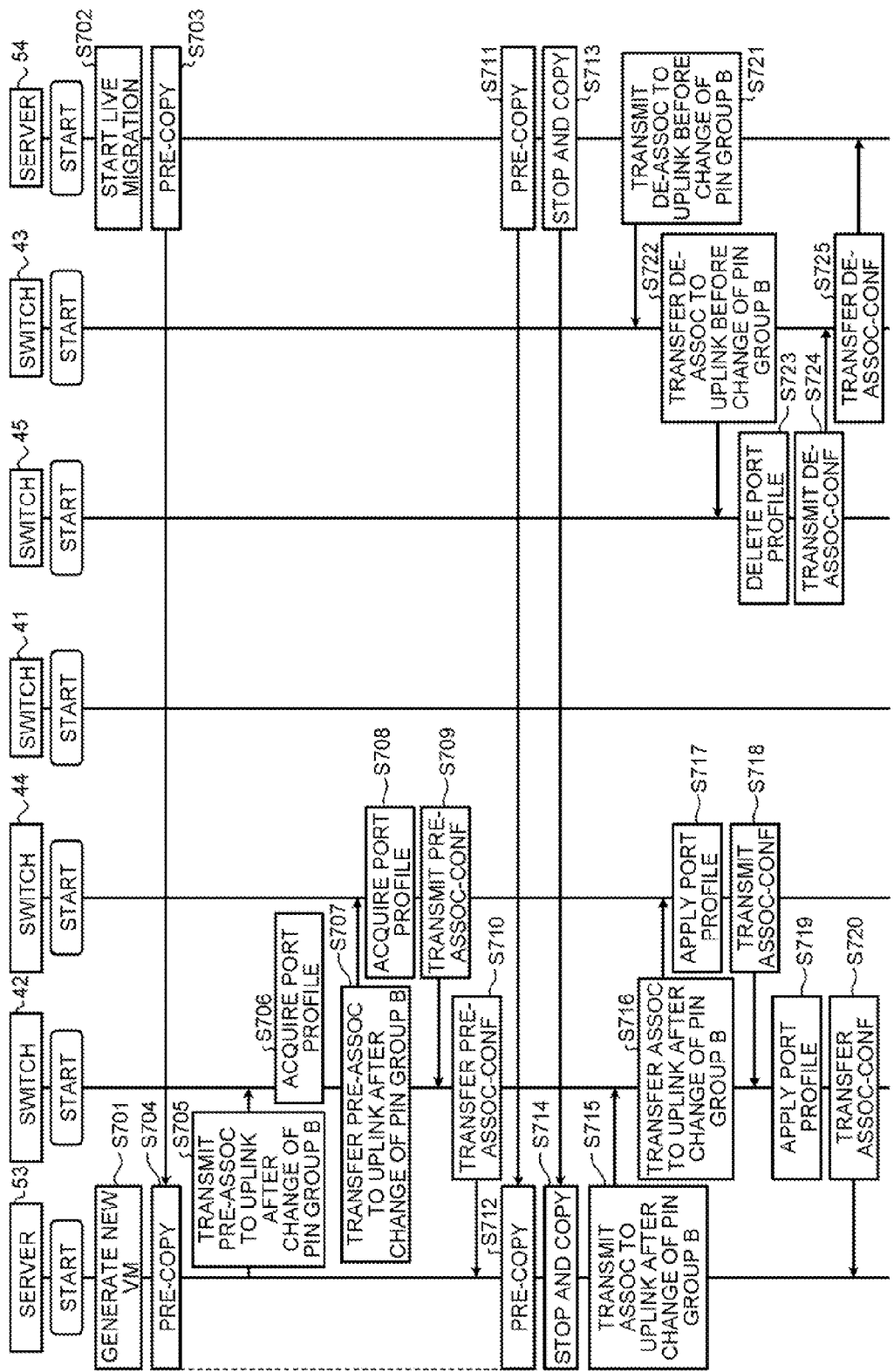
FIG. 23 is a sequence diagram for describing the flow of a process of transferring a VDP message according to a pin group and content of a VDP message.

Next, the flow of a process of transferring a VDP message according to a pin group to which a VM of a migration target belongs and content of a VDP message will be described with reference to FIG. 23. FIG. 23 is a sequence diagram for describing the flow of a process of transferring a VDP message according to a pin group and content of a VDP message. FIG. 23 illustrates a process executed when the VM #4 is moved from the server 54 to the server 53, and it is assumed that the entry of the pin group B of the pin group information 50a, which illustrated in FIG. 19, is transmitted to each of the switches 41 to 45. In other words the server 53 is the destination server. And the server 54 is the source server.

For example, the server 53 first generates a new VM on its own server (step S701). Subsequently, the server 54 receives a live migration instruction from the management server 50 (step S702), and then executes the pre-copy process in a state in which a migration target VM is being operated by its own server (steps S703 and S704).

When the pre-copy process starts, the server 53 transmits the PRE-ASSOC message to the switch 42 which is an upper-level switch which is at a level higher than itself in a path up to the switch 44 which is the uplink after change of the pin group B (step S705). In this case, the 42 acquires a port profile (step S706), and transfers the PRE-ASSOC message to the switch 44 which is the uplink after change of the pin group B (step S707). Next, when the PRE-ASSOC message is received, the switch 44 acquires a port profile (step S708), and then transmits the PRE-ASSOC-CONF message to the switch 42 (step S709).

In this case, the switch 42 transfers the PRE-ASSOC-CONF message to the server 53 (step S710). Thereafter, the server 53 and the server 54 continue the pre-copy process (steps S711 and S712). Then, when a change amount of memory is a predetermined value or less, the server 53 and the server 54 execute the stop and copy process (steps S713 and S714).

When the stop and copy process starts, the server 53 transmits the ASSOC message to the switch 42 of the upper level which is at a level higher than itself in a path up to the switch 44 which is the uplink after change of the pin group B, similarly to the ASSOC message (step S715). In this case, the destination switch 42 transfers the ASSOC message to the switch 44 which is the uplink after change of the pin group B (step S716). Further, when the ASSOC message is received, the switch 44 applies the port profile acquired in step S708 (step S717), and then transmits the ASSOC-CONF message to the switch 42 (step S718).

When the ASSOC-CONF message is received from the switch 44, the switch 42 applies the port profile acquired in step S706 (step S719). Thereafter, the switch 42 transfers the ASSOC-CONF message to the destination server 53 (step S720).

Further, after the stop and copy process is executed, the server 54 transmits the DE-ASSOC message to the source switch 43 which is an upper-level switch which is at a level higher than itself in a path up to the switch 45 which is the uplink before change of the pin group B (step S721). In this case, the switch 43 transfers the DE-ASSOC message to the switch 45 which is the uplink before change of the pin group B (step S722).

Thus, the switch 45 deletes the port profile related to the VM #4 (step S723), and then transmits the DE-ASSOC-CONF message to the switch 43 (step S724). Then, when the DE-ASSOC-CONF message is received, the switch 43 deletes the port profile related to the VM #4, and then transfers the DE-ASSOC-CONF message to the server 54 (step S725).

Further, each of the switches 41 to 45 of the fabric 46 executes the following process when dynamic learning of a MAC address is not performed. In other words, each of the switches 41 to 45 transmits a reverse ARP (address resolution protocol) or the like, and notifies the other switches of the fact that a MAC address and an IP address of a VM to move have been migrated to the destination server, so that a path through which data of a moved VM is transferred is changed. Specifically, a communication path is changed such that the switches 44 and 45 serving as uplink broadcast information of a pin group to which a VM to move belongs to the lower-level switches 41 to 43.

Figure 24:
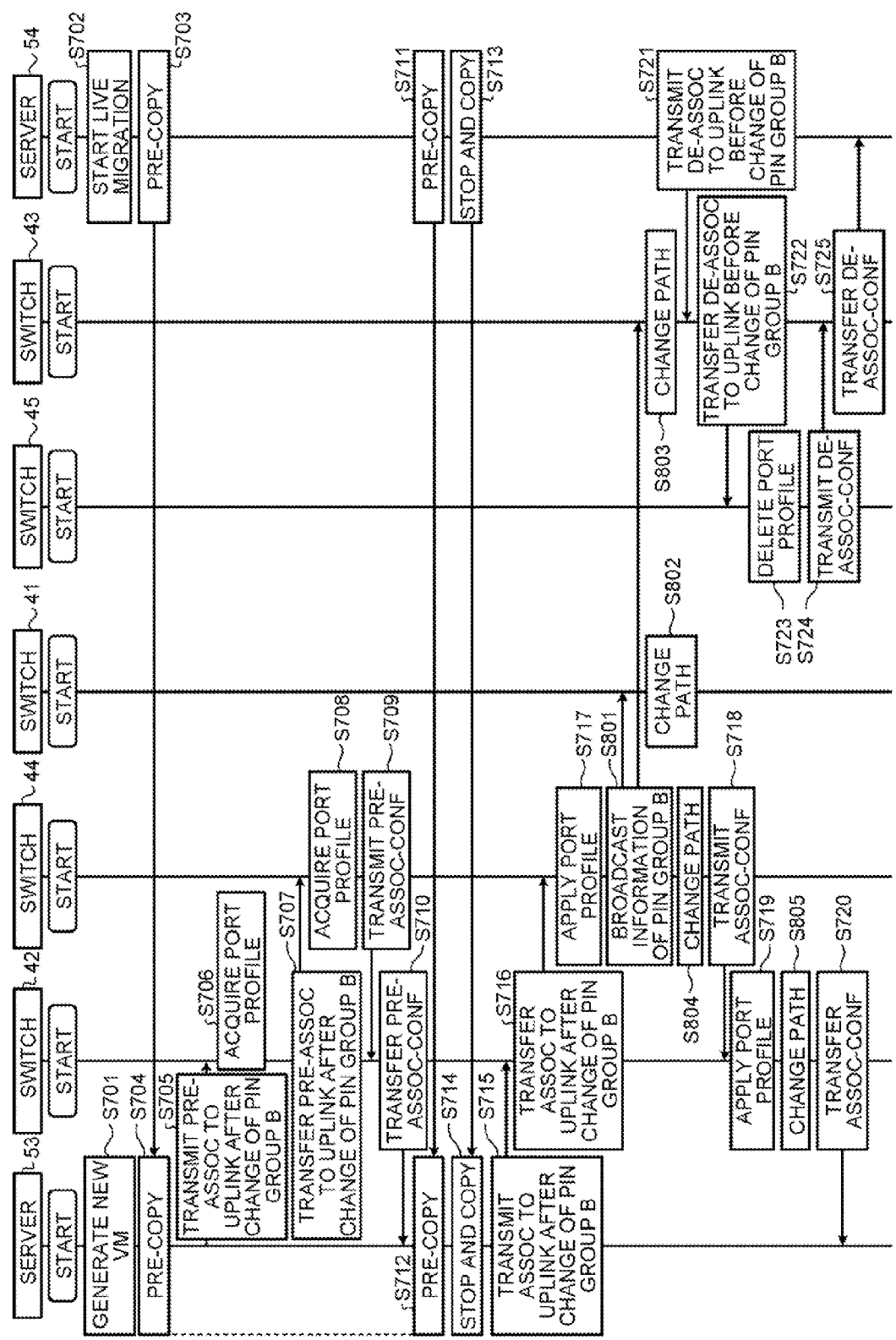
FIG. 24 is a sequence diagram for describing the flow of a process when dynamic learning of a MAC address is not performed.

Next, the flow of a process of changing a path by each of the switches 41 to 45 when dynamic learning of a MAC address is not performed will be described with reference to FIG. 24. FIG. 24 is a sequence diagram for describing the flow of a process when dynamic learning of a MAC address is not performed. Among processes illustrated in FIG. 24, the same processes as in FIG. 23 are denoted by the same step numbers, and thus the redundant description will not be repeated.

For example, when the switch 44 which is the uplink after change of the pin group B receives the ASSOC message from the switch 42, and applies a port profile (step S717), the switch 44 executes the following process. In other words, the switch 44 broadcasts information of the pin group B to the switch 41 and the switch 43 of the lower level which are at a level lower than itself from ports other than a port through which the ASSOC message has been received (step S801). Specifically, the switch 44 broadcasts information of a path used to relay communication between the VM #3 and the VM #4 belonging to the pin group B.

Then, the switch 41 which is the lower-level switch of the switch 44 changes the MAC table 18 according to the information of the received pin group B (step S802). Further, the switch 43 which is the lower-level switch of the switch 44 changes its MAC table according to the information of the pin group B, similarly to the switch 41 (step S803).

Further, when the switch 44 has broadcasted the information of the pin group B, the switch 44 changes its MAC table and applies a path change (step S804). Further, when the port profile has been applied (step S719), the switch 42 changes its MAC table and applies a path change (step S805).

In other words, the switches 1 to 5 according to the first embodiment change a path by revising the MAC addresses illustrated in FIGS. 9A to 9E to the MAC addresses illustrated in FIGS. 11A to 11E, respectively. Each of the switches 41 to 45 applies a path change by applying revision based on the information of the pin group B which has been broadcasted, in the same manner as the switches 1 to 5.

Figure 25:
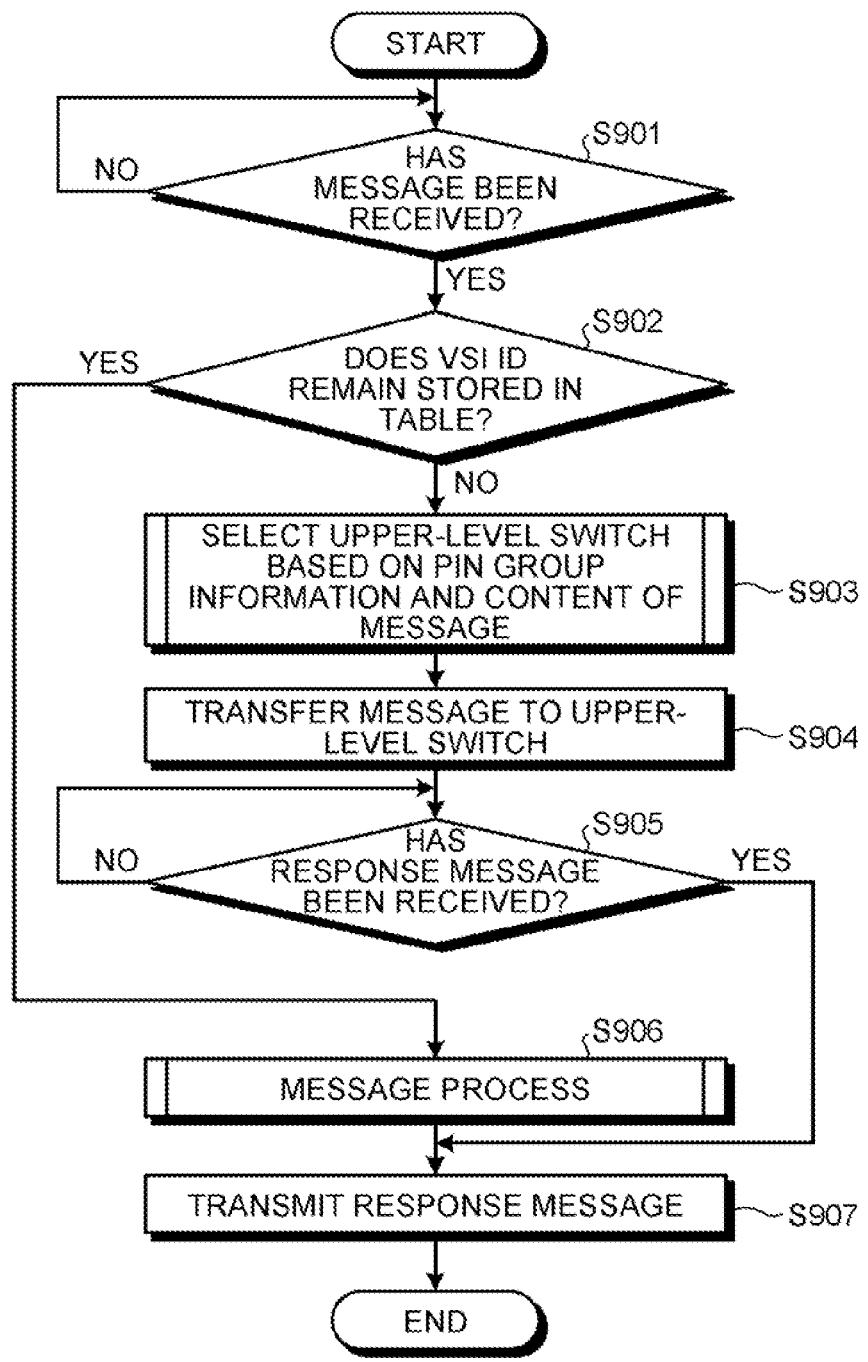
FIG. 25 is a flowchart for describing the flow of a process executed by a switch according to the second embodiment.

Next, the flow of a process executed by the switch 41 will be described with reference to FIG. 25. FIG. 25 is a flowchart for describing the flow of a process executed by a switch according to the second embodiment. In the example illustrated in FIG. 25, the switch 41 determines whether or not a VDP message has been received (step S901). Then, when the VDP message has been received (Yes in step S901), the switch 41 determines whether or not a VSI ID included in the VDP message remains stored in the VSI table 16 (step S902).

Then, when the VSI ID does not remain stored in the VSI table 16 (No in step S902), the switch 41 selects an upper-level switch based on pin group information and content of the VDP message (step S903). Then, the switch 41 transfers the VDP message to the upper-level switch (step S904).

Further, the switch 41 determines whether or not a response message has been received from the upper-level switch (step S905). When the response message has been received from the upper-level switch (Yes in step S905), the switch 41 transmits the response message to the transmission source of the VDP message (step S907), and then ends the process. However, when the VSI ID included in the VDP message remains stored in the VSI table 16 (Yes in step S902), the switch 41 executes a process corresponding to the VDP message (step S906). In other words, the switch 41 executes each process illustrated in FIG. 16 and revises the port profile table.

Further, when the VDP message has not been received (No in step S901), the switch 41 determines whether or not the VDP message has been received again (step S901). Further, when the response message has not been received (No in step S905), the switch 41 determines whether or not the response message has been received again (step S905).

Figure 26:
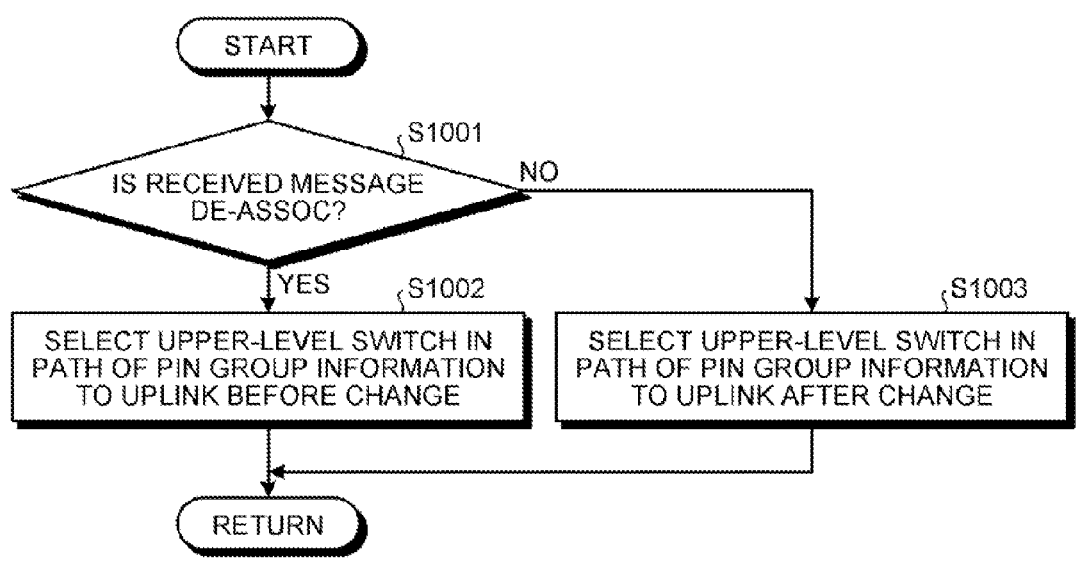
FIG. 26 is a flowchart for describing the flow of a process of selecting an upper-level switch by a switch according to the second embodiment.

Next, the flow of the process of selecting an upper-level switch by the switch 41 in step S903 in FIG. 25 will be described with reference to FIG. 26. FIG. 26 is a flowchart for describing the flow of a process of selecting an upper-level switch by a switch according to the second embodiment. For example, the switch 41 determines whether or not the received VDP message is the DE-ASSOC message (step S1001).

Then, when the received VDP message is the DE-ASSOC message (Yes in step S1001), the switch 41 selects an upper-level switch in a path of pin group information to the uplink before change (step S1002), and then executes the process of step S904. However, when the received VDP message is not the DE-ASSOC message (No in step S1001), the switch 41 selects an upper-level switch in a path of pin group information to the uplink after change (step S1003), and then executes the process of step S904.

Figure 27A:
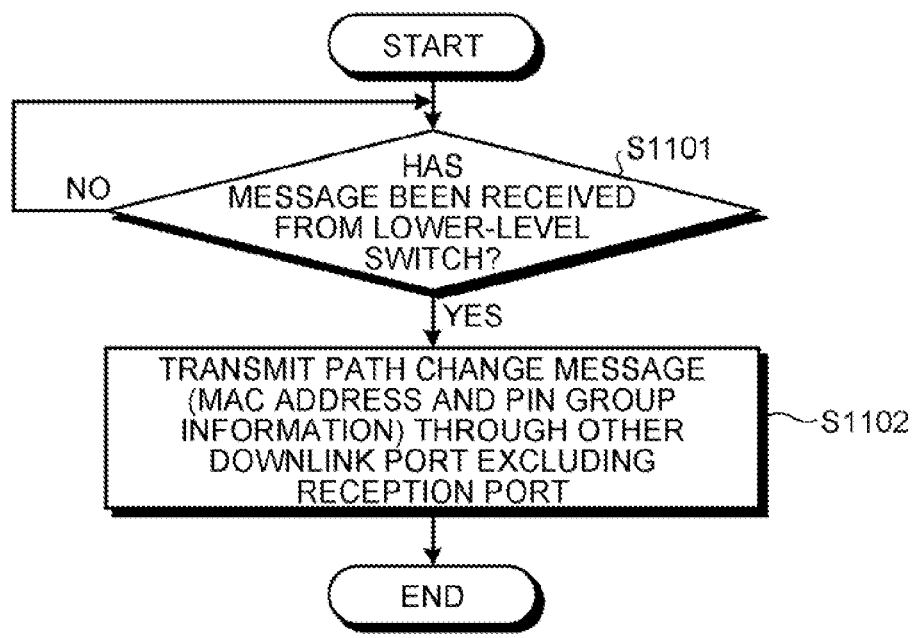
FIG. 27A is a flowchart for describing an example of the flow of a process of transmitting a path change message by an upper-level switch.

Next, the flow of a process in which the upper-level switch, that is, a switch that has received a VDP message from another switch broadcasts a path change message including pin group information and a MAC address which is a target of a path change will be described with reference to FIG. 27A. FIG. 27A is a flowchart for describing an example of the flow of a process of transmitting a path change message by an upper-level switch.

For example, in the example illustrated in FIG. 27A, the switch 44 determines whether or not a VDP message has been received from a lower-level switch such as the switch 42 (step S1101). Then, when the VDP message has been received (Yes in step S1101), the switch 44 executes the following process.

In other words, the switch 44 transmits the path change message through other downlink ports excluding a port through which the VDP message has been received, that is, through ports connected to the lower-level switch (step S1102), and then ends the process. Here, the path change message includes a MAC address which is a path change target and pin group information. The process illustrated in FIG. 27A corresponds to the process of step S801 in FIG. 24. Meanwhile, when the VDP message has not been received from the lower-level switch (No in step S1101), the switch 44 determines whether or not the VDP message has been received again (step S1101).

Figure 27B:
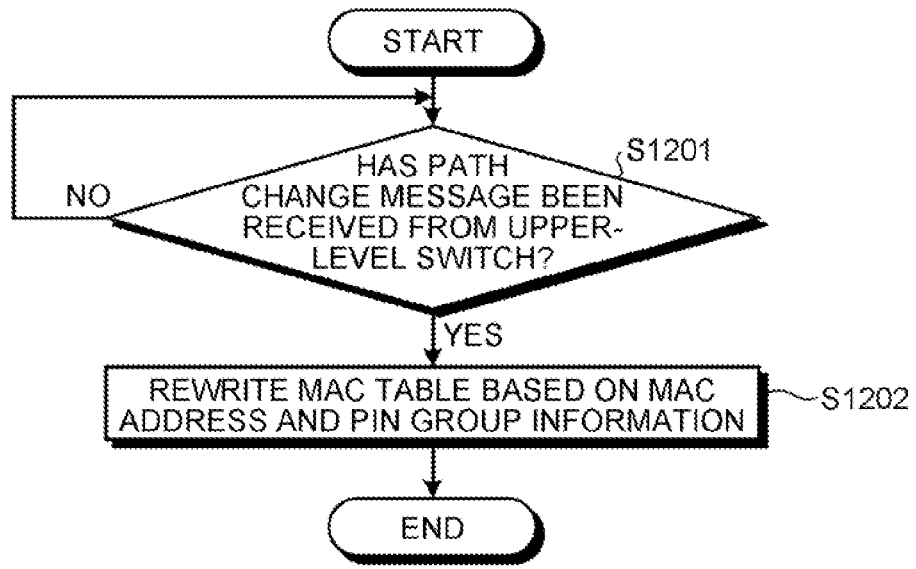
FIG. 27B is a flowchart for describing the flow of a process executed when a lower-level switch receives a path change message.

Next, the flow of a process in which a switch that has received a path change message broadcasted by an upper-level switch changes a path will be described with reference to FIG. 27B. FIG. 27B is a flowchart for describing the flow of a process executed when a lower-level switch receives a path change message.

For example, in the example illustrated in FIG. 27B, the switch 41 determines whether or not a path change message has been received from an upper-level switch such as the switch 44 (step S1201). Then, when the path change message has been received (Yes in step S1201), the switch 41 rewrites the MAC table 18 based on a MAC address and pin group information included in the received path change message (step S1202), and then ends the process. However, when the path change message has not been received from the upper-level switch (No in step S1201), the switch 41 determines whether or not the path change message has been received from the upper-level switch again (step S1201).

Effects of Second Embodiment

As described above, when a VSI ID included in a received VDP message does not remain stored, the switches 41 to 45 select an upper-level switch to which the VDP message is transferred based on content of the VDP message and a pin group to which a VM of a migration target belongs. Then, the switches 41 to 45 transfer the VDP message to the selected switch.

Thus, the switches 41 to 45 can transfer a VDP message to a switch that needs to change a port profile without broadcasting the VDP message to the upper-level switch. As a result, even when the information processing system 40 relays communication of each of the servers 51 to 54 or the external network 49 using the fabric 46, a port profile can be automatically set.

Further, when content of a VDP message is the PRE-ASSOC message or the ASSOC message, the switches 41 to 45 identify an uplink after change to which a VM of a migration target is pin-connected after migration. Thereafter, the switches 41 to 45 transfer the VDP message to the identified uplink after change. However, when content of a VDP message is the DE-ASSOC message, the switches 41 to 45 identify an uplink before change to which a VM of a migration target is pin-connected before migration. Then, the switches 41 to 45 transfer the VDP message to the identified uplink after change.

In other words, each of the switches 41 to 45 transfers the DE-ASSOC message to a switch present on a path to an uplink to which a VM is pin-connected before migration. Further, each of the switches 41 to 45 transfers the PRE-ASSOC message or the ASSOC message to a switch present on a path to an uplink to which a VM is pin-connected after migration. As a result, each of the switches 41 to 45 can transfer the VDP message to a switch that needs to update a port profile due to migration of a VM.

Further, the switches 41 to 45 perform port profile setting when its own switch is the uplink before change or the uplink after change, that is, when its own switch is an upper-level switch which is highest among switches to which the VDP message is transferred. Then, the switches 41 to 45 transmit a response to a transfer source of the VDP message. Thus, even when its own switch relays communication of the external network 49 or each of the servers 51 to 54 as an uplink, the switches 41 to 45 can appropriately perform port profile setting.

[c] Third Embodiment

The embodiments of the present invention have been described so far, but the present invention is not limited to the above embodiments and may be embodied in various forms. In this regard, another embodiment will be described below.

(1) Regarding Path Selection

Each of the switches 1 to 5 described above determines an upper-level switch that needs to update a port profile using a path ID included in each message, and transfers each message to the determined switch. However, an embodiment is not limited to this example, and each of the switches 1 to 5 can use any method to the extent that each message can be transferred to a switch that needs to update a port profile.

For example, when a VSI ID included in each received message does not remain stored, each of the switches 1 to 5 may broadcast the received message to an upper-level switch which is at a level higher than itself. In this case, an upper-level switch that has received the broadcasted message may update its port profile based on the VSI ID represented by the received message. In this case, since the process of determining an upper-level switch can be skipped, each of the switches 1 to 5 can rapidly perform automatic setting of a port profile on the upper-level switch.

Further, each of the switches 1 to 5 consolidates, for example, a path ID in an FDB (forwarding database). Each of the switches 1 to 5 may set a MAC address stored in association with a path ID included in each received message as the destination and then transfer each message. In other words, each of the switches 1 to 5 may determine an upper-level switch to which each message is transferred using a path ID included in each received message and the FDB. In this case, each of the switches 1 to 5 needs not include the path table, and thus the device size can be reduced.

Further, each of the switches 1 to 5 stores information identifying a virtual network used by a VM, that is, information of a VLAN. Each of the switches 1 to 5 determines a VLAN used by a VM of a migration target using a VSI ID of each message, and transfers each message to a switch related to the determined VLAN. In this case, each of the switches 1 to 5 can determine an upper-level switch to which each message is transferred based on a VLAN through a simple process.

Further, each of the switches 1 to 5 may select an upper-level switch to which each message is transferred based on a port number through which each message has been transferred. When this process has been executed, each of the switches 1 to 5 can determine an upper-level switch to which each message is transferred based on an input port number through a simple process.

Further, each of the switches 1 to 5 may determine a switch of a transfer destination of each message based on a MAC address or an IP address of a server or a switch which is a transmission source of each message. Each of the switches 1 to 5 can perform fine path selection when a transfer destination of each message is determined based on a MAC address or an IP address of a server or a switch which is a transmission source of each message.

Further, each of the switches 1 to 5 sets a priority (priority group) on a switch or a server connected with itself. For example, depending on the type of traffic, each of the switches 1 to 5 sets "priority 3" to a switch or a server, included in a network, operated as a storage, and sets "priority 0" to a switch or a server included in another local area network (LAN). Then, when a priority set to a transmission source of each received message is "priority 3," each of the switches 1 to 5 transfers each message an upper-level switch of "priority 3." Further, when a priority set to a transmission source of each received message is "priority 0," each of the switches 1 to 5 transfers each message an upper-level switch of "priority 0." When this process is executed, each of the switches 1 to 5 can determine an upper-level switch based on the type of network which is an update target of a port profile.

(2) Regarding Network

The above embodiments have been described in connection with the example in which the switches 1 to 5 are connected with the servers 11 to 14 through a multipath. However, an embodiment is not limited to this example. For example, an arbitrary number can be applied as the number of switches or servers. Further, an arbitrary number of levels can be applied as the number of switches that relay communication between servers. For example, communication between the server 11 and the server 14 may be relayed by 5 switches, and communication between the server 12 and the server 13 may be relayed by 3 switches.

(3) Regarding Management Server

In the above embodiments, each of the servers 11 to 14 gives an instruction to the management server 10 to execute live migration. However, an embodiment is not limited to this example. For example, each time live migration, an administrator may transmit an instruction to each of the servers 11 to 14 through a management terminal and the like.

(4) Regarding Each Process

Further, among the processes described in the above embodiments, all or some of the processes described to be automatically performed may be manually performed. Alternatively, all or some of the processes described to be manually performed may be automatically performed using a well-known technique. In addition, a process procedure, a control procedure, a concrete name, and information including various data or parameters which are described in this specification or illustrated in the drawings can be arbitrarily changed unless specified otherwise.

Further, each component of each device illustrated in the drawings is functionally conceptual, and needs not necessarily be physically configured as illustrated in the drawings. In other words, for example, the receiving unit 22 may be integrated with the determining unit 23, and a specific form of dispersion or integration of respective devices is not limited to ones illustrated in the drawings. In other words, all or some of respective devices may be functionally or physically dispersed or integrated in arbitrary units according to various loads, use conditions, or the like. In addition, all or any part of processing functions performed in respective devices may be implemented by a CPU and a program analyzed and executed by the CPU or may be implemented as hardware by a wired logic.

(5) Regarding Upper-Level Switch to Which VDP Message is Transferred

The switches 41 to 45 described above selects an upper-level switch to which a VDP message is transferred according to the type of received VDP message and an uplink to which a VM of a pin group to which a VM to move belongs is pin-connected. However, an embodiment is not limited to this example. For example, the switches 41 to 45 may select an upper-level switch to which a VDP message is transferred according to an uplink to which a VM of a pin group to which a VM to move belongs is pin-connected regardless of the type of VDP message.

Specifically, when a VSI ID included in a VDP message does not remain in a VSI table, the switches 41 to 45 may identify an uplink before change to which a VM of a migration target is pin-connected before migration or an uplink after change to which a VM of a migration target is pin-connected after migration. Then, the switches 41 to 45 may transfer a VDP message to an upper-level switch on a path through which data is transmitted to the identified uplink before change or the identified uplink after change.

In other words, since the switches 41 to 45 transfer a VDP message only to an upper-level switch corresponding to a pin group of a VM of a migration target, traffic in the fabric 46 can be reduced.

(6) Regarding Selection of Upper-Level Switch Using Another Information

The switches 1 to 5 and the switches 41 to 45 described above selects an upper-level switch to which a VDP message is transferred using a path ID or information of a pin group. However, an embodiment is not limited to this example. For example, when communication is not performed between VMs of different pin groups, each of the switches 41 to 45 may relay a VDP message only to an upper-level switch to which a VM belonging to the same pin group as a VM of a migration target is pin-connected.

Figure 28:
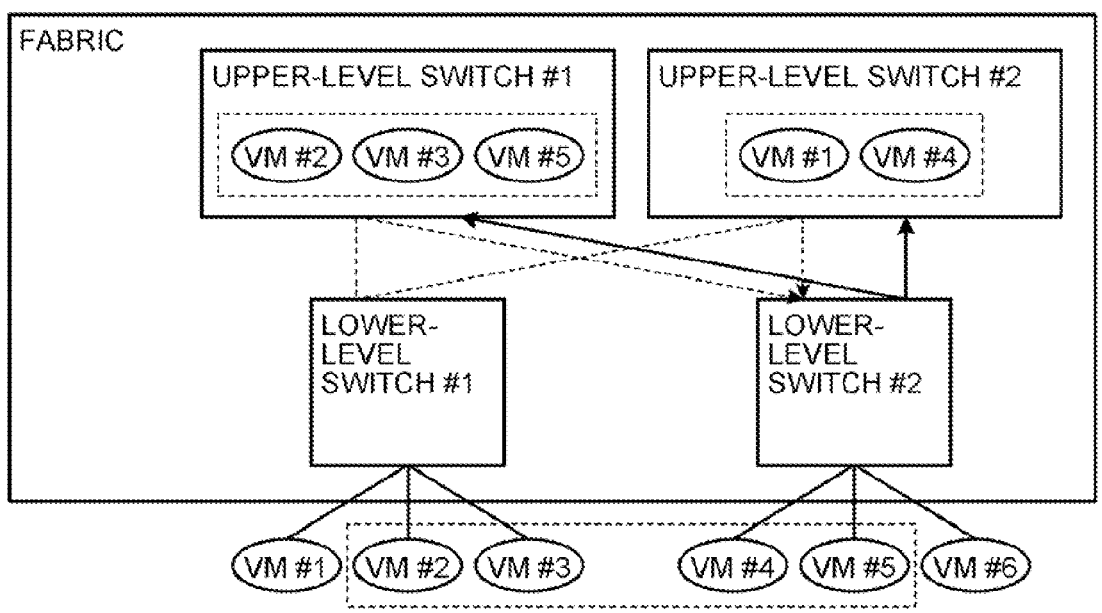
FIG. 28 is a diagram for describing an example of a variation.

Further, the switches 41 to 45 may select an upper-level switch to which a VDP message is transferred using information of a client that uses each VM, that is, tenant information. An example of a switch that transfers a VDP message using tenant information will be described with reference to FIG. 28. FIG. 28 is a diagram for describing an example of a variation.

In the example illustrated in FIG. 28, a fabric includes an upper-level switch #1, an upper-level switch #2, a lower-level switch #1, and a lower-level switch #2. Further, the VMs #1 to #3 are present under the lower-level switch #1, and the VMs #4 to #6 are present under the lower-level switch #2. Further, the VMs #2 to #5 are VMs of the same tenant. Further, in the example illustrated in FIG. 28, the VM #2, the VM #3, and the VM #5 are pin-connected to the upper-level switch #1, and the VM #1 and the VM #4 are pin-connected to the upper-level switch #2.

When a VDP message is received, each of the switches 41 to 45 identifies an upper-level switch which is not pin-connected with a vNIC (virtual network interface card) of the same tenant as a VM of a migration target and not pin-connected to its vNIC. Then, each of the switches 41 to 45 transfers a VDP message to an upper-level switch other than the identified upper-level switch. Further, each of the switches 41 to 45 does not select an upper-level switch which is pin-connected with a vNIC through which there is little possibility that communication is performed by a VM of the same tenant, for example, a vNIC present under a lower-level switch.

For example, in the example illustrated in FIG. 28, when a VDP message related to the VM #5 is received, the lower-level switch #2 determines that the upper-level switch #2 is not pin-connected with the vNICs of the VMs #2 to #4 of the same tenant as the VM #5. Further, the lower-level switch #2 determines that the upper-level switch #2 is not pin-connected with its vNIC. Then, the lower-level switch #2 transfers the VDP message only to the upper-level switch #1. As a result, the lower-level switch #2 can appropriately change a port profile without transferring a VDP message to the upper-level switch #2, and thus traffic in a fabric can be reduced.

(7) Program

Figure 29:
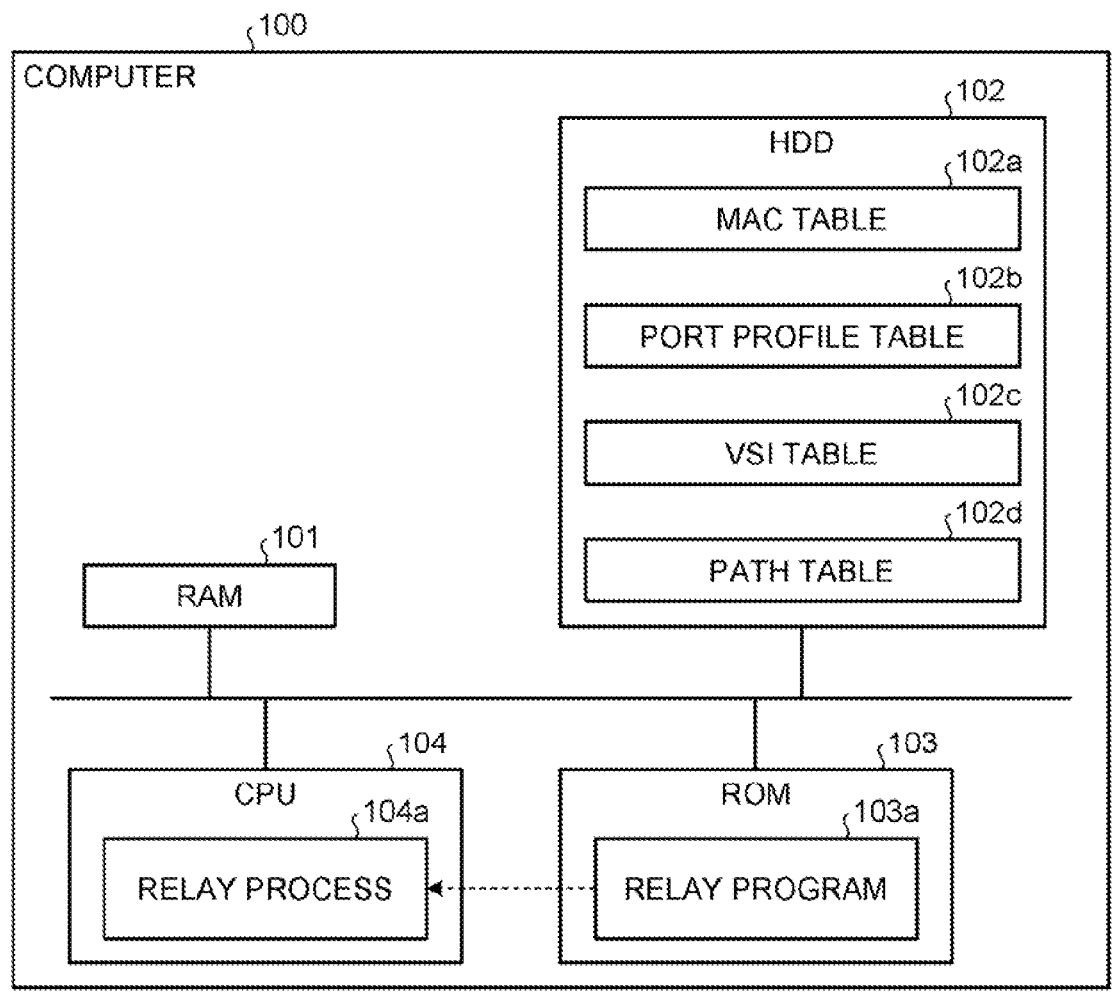
FIG. 29 is diagram for describing an example of a computer that executes a relay program.
Figure 30:
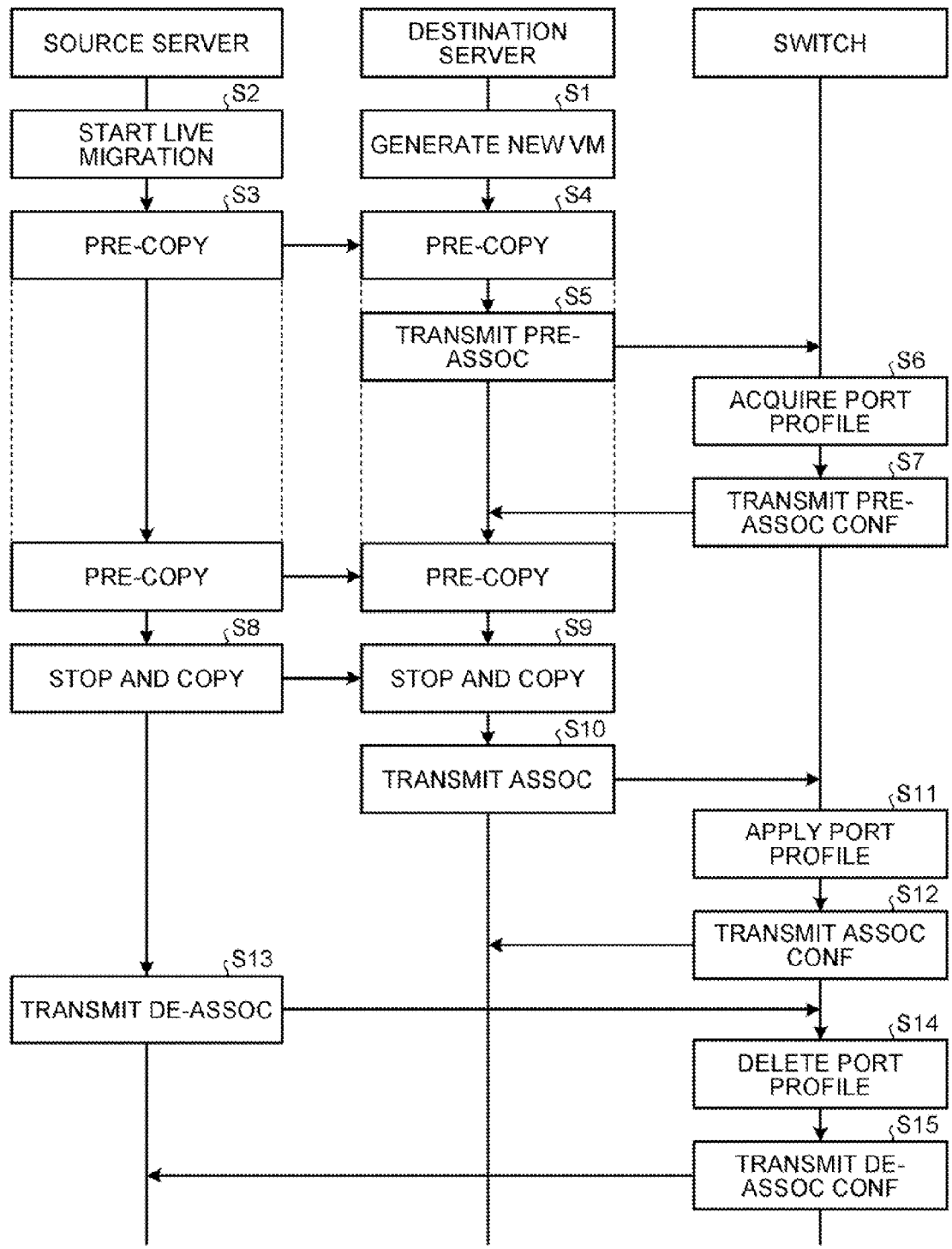
FIG. 30 is a sequence diagram illustrating an example of an automated process of a port profile according to a related art.
Figure 31:
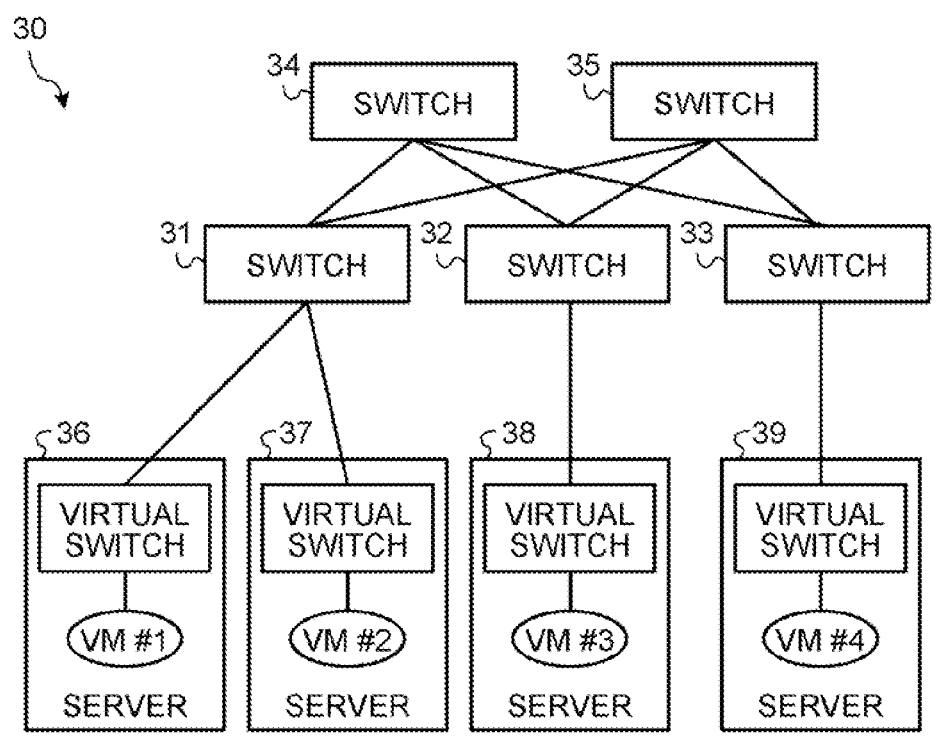
FIG. 31 is a diagram for describing an example of a system to which a multipath technique is applied.

Meanwhile, the first embodiment and the second embodiment have been described in connection with each of the switches 1 to 5 and each of the switches 41 to 45 implement various processes using hardware. However, an embodiment is not limited to this example. The various processes may be implemented by a previously prepared program through a computer included in a data relay device. In this regard, an example of a computer executing a program having the same function as the control unit 20 or the control unit 20*a* will be described below with reference to FIG. 29. FIG. 29 is a diagram for describing an example of a computer that executes a relay program.

A computer 100 illustrated in FIG. 29 includes a RAM (random access memory) 101, an HDD (hard disk drive) 102, a ROM (read only memory) 103, and a CPU 104. A MAC table 102a, a port profile table 102b, a VSI table 102c, and a path table 102d are stored in the HDD 102 in advance. The tables 102a to 102d are assumed to include the same information as the tables 15 to 18 illustrated in FIG. 5.

A relay program 103a remains stored in the ROM 103, and the CPU 104 reads and executes the relay program 103a and so functions as a relay process 104a in the example illustrated in FIG. 29. The relay process 104a performs the same function as the control unit 20 illustrated in FIG. 1 but may be configured to perform the same function as the control unit 20a illustrated in FIG. 20.

The relay program described in the present embodiment may be implemented by executing a previously prepared program through a computer such as a personal computer or a work station. The program may be distributed via a network such as the Internet. Further, the program is recorded in a computer readable recording medium such as a hard disk, an FD (flexible disk), a CD-ROM (compact disc read only memory), an MO (magneto optical disc), or a DVD (digital versatile disc). Further, the program may be read from a recording medium and executed by a computer.

According to an aspect of an embodiment, a port profile can be automatically set to switches connected at multiple levels.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data relay device comprising:
a memory; and
a processor coupled to the memory, wherein the processor executes a data relay process comprising:
receiving a virtual machine identifier representing a virtual machine of a migration target, a path identifier representing a communication path through which the virtual machine performs communication and a setting request of a port profile from a server connected with the data relay device;
determining whether a storage device, which stores a virtual machine identifier of a virtual machine operated by the server connected with the data relay device and a port used by the virtual machine, stores the virtual machine identifier received by the receiving in association with another port; and
transferring the setting request of the port profile to a data relay device of an upper level higher than the data relay device, wherein the transfetting includes determining the communication path represented by the path identifier received by the receiving and the data relay device is in the determined communication path, when it is determined by the determining that the received virtual machine identifier is not stored in association with the other port.

2. The data relay device according to claim 1, the data relay process executed by the processor further comprising executing updating a port profile of the virtual machine represented by the virtual machine identifier based on the setting request of the port profile received by the receiving when it is determined by the determining that the storage device stores the received virtual machine identifier in association with the other port.

3. The data relay device according to claim 2, wherein the executing includes executing updating the port profile of the virtual machine represented by the virtual machine identifier received by the receiving based on the setting request of the port profile received by the receiving when there is no data relay device of an upper level higher than the data relay device in the communication path represented by the path identifier received by the receiving.

4. The data relay device according to claim 3, wherein the receiving includes receiving a response to the setting request of the port profile from a data relay device of an upper level higher than the data relay device, and
the transferring includes transferring the response to a data relay device of a lower level lower than the data relay device or the server connected with the data relay device after the response is received by the receiving from the data relay device of the upper level.

5. The data relay device according to claim 4, wherein the executing includes executing updating the port profile after the response is received by the receiving from the data relay device of the upper level.

6. The data relay device according to claim 1, wherein the transferring includes broadcasting the setting request of the port profile to a data relay device of an upper level higher than the data relay device when it is determined by the determining that the storage device does not store the virtual machine identifier received by the receiving in association with the other port.

7. The data relay device according to claim 1, wherein
the transferring includes transferring the setting request of the port profile to a data relay device represented by a MAC address stored in a path information storage device, that stores a path identifier representing a communication path including the data relay device in association with a MAC address, and associated, in the path information storage device, with the path identifier received by the receiving when it is determined by the determining that the storage device does not store the virtual machine identifier received by the receiving in association with the other port.

8. The data relay device according to claim 1, wherein the receiving includes receiving the setting request including information for determining a virtual network used by the virtual machine of the migration target, and
the transferring includes determining a virtual network used by the virtual machine of the migration target using the information, and transferring the setting request of the port profile to a data relay device that relays data of the virtual machine in the determined virtual network.

9. The data relay device according to claim 1, wherein the transferring includes retrieving a data relay device stored in association with a port number used to receive the setting request of the port profile from a transfer storage device that stores a port number used to receive data to relay in association with a data relay device which is a transmission destination of the data, and transferring the setting request of the port profile to the retrieved data relay device.

10. The data relay device according to claim 1, wherein the transferring includes retrieving a data relay device stored in association with a MAC address of a server which is a transmission source of the setting request of the port profile from a MAC address storage device that stores a MAC address of a server which is a transmission source of received data in association with a data relay device which is a transfer destination of the data, and transferring the setting request of the port profile to the retrieved data relay device.

11. The data relay device according to claim 1, wherein the transferring includes retrieving a data relay device stored in association with an IP address of a server which is a transmission source of the setting request of the port profile from an IP address storage device that stores an IP address of a server which is a transmission source of received data in association with a data relay device which is a transfer destination of the data, and transferring the setting request of the port profile to the retrieved data relay device.

12. The data relay device according to claim 1, wherein the receiving includes receiving priority information and the setting request of the port profile, and
the transferring includes retrieving a data relay device stored in association with the received priority information from a priority information storage device that stores priority information representing a priority for transferring data to relay in association with a data relay device which is a transmission destination of the data, and transferring the setting request of the port profile to the retrieved data relay device.

13. The data relay device according to claim 1, the data relay process executed by the processor further comprising:
selecting a data relay device of an upper level to which the setting request of the port profile is transferred based on a group of virtual machine connected to an external network through a same uplink as the virtual machine of the migration target and content of the setting request of the port profile when it is determined by the determining that the storage device does not store the virtual machine identifier received by the receiving in association with the other port; wherein
the transferring includes transferring the setting request of the port profile to the data relay device selected by selecting.

14. The data relay device according to claim 13, wherein the transferring includes selecting a data relay device of an upper level based on an uplink used before the virtual machine represented by the virtual machine identifier received by the receiving is moved when the content of the setting request of the port profile represents deletion of a port profile, selecting a data relay device of an upper level based on an uplink used after the virtual machine is moved when it is determined by the determining that the storage device does not store the received virtual machine identifier in association with the other port and the content of the setting request of the port profile represents application of a new port profile, and transferring the setting request of the port profile received by the receiving to the selected data relay device of the upper level.

15. The data relay device according to claim 14, the data relay process executed by the processor further comprising: executing updating a port profile of the virtual machine represented by the virtual machine identifier received by the receiving based on the setting request of the port profile received by the receiving when there is no data relay device of an upper level higher than the data relay device in an uplink that allows the virtual machine represented by the virtual machine identifier received by the receiving to be connected to an external network.

16. The data relay device according to claim 1, wherein the transferring includes selecting a data relay device of an upper level to which the setting request of the port profile is transferred based on a group of virtual machines connected to an external network through a same uplink as the virtual machine of the migration target and a group of virtual machines that provide a service to a same tenant when it is determined by the determining that the storage device does not store the received virtual machine identifier in association with the other port, and transferring the setting request of the port profile to the selected data relay device of the upper level.

17. The data relay device according to claim 1, wherein the transferring includes selecting a data relay device of an upper level based on an uplink that allows the virtual machine represented by the virtual machine identifier to be connected to an external network when it is determined by the determining that the storage device does not store the virtual machine identifier received by the receiving in association with the other port, and transferring the setting request of the port profile to the selected data relay device.

18. A non-transitory computer-readable recording medium having stored therein a data relay program for causing a computer to execute a data relay process comprising:
receiving a virtual machine identifier representing a virtual machine of a migration target, a path identifier representing a communication path through which the virtual machine performs communication and a setting request of a port profile from a server connected with the computer;
determining that determining whether or not a storage device, which stores a virtual machine identifier of a virtual machine operated by the server connected with the computer and a port used by the virtual machine, stores the virtual machine identifier received by the receiving in association with another port; and
transferring the setting request of the port profile to a data relay device of an upper level higher than the computer, wherein the transferring includes determining the communication path represented by the path identifier received by the receiving and the computer is in the determined communication path, when it is determined by the determining that the received virtual machine identifier is not stored in association with the other port.

19. The non-transitory computer-readable recording medium according to claim 18, the data relay process further comprising:
selecting a data relay device of an upper level to which the setting request of the port profile is transferred based on a group of virtual machines connected to an external network through a same uplink as the virtual machine of the migration target and content of the setting request of the port profile when it is determined by the determining that the storage device does not store the virtual machine identifier received by the receiving in association with the other port; wherein
the transferring includes transferring the setting request of the port profile to the data relay device selected by selecting.

20. A data relay method executed by a computer that relays data between servers operating a virtual machine, the data relay method comprising:
receiving a virtual machine identifier representing a virtual machine of a migration target, a path identifier representing a communication path through which the virtual machine performs communication and a setting request of a port profile from a server connected with the computer;

determining whether or not a storage device, which stores a virtual machine identifier of a virtual machine operated by the server connected with the computer and a port used by the virtual machine, stores the virtual machine identifier received by the receiving in association with another port; and transferring the setting request of the port profile to a data relay device of an upper level higher than the computer, wherein the transferring includes determining the communication path represented by the path identifier received by the receiving and the computer is in the determined communication path, when it is determined by the determining that the received virtual machine identifier is not stored in association with the other port.

21. The data relay method according to claim 20, further comprising:

selecting a data relay device of an upper level to which the setting request of the port profile is transferred based on a group of virtual machines connected to an external network through a same uplink as the virtual machine of the migration target and content of the setting request of the port profile when it is determined by the determining that the storage device does not store the virtual machine identifier received by the receiving in association with the other port; wherein the transferring includes transferring the setting request of the port profile to the data relay device selected by selecting.

* * * * *